(12) United States Patent
Jacobsen et al.

(10) Patent No.: US 9,235,262 B2
(45) Date of Patent: Jan. 12, 2016

(54) REMOTE CONTROL OF HOST APPLICATION USING MOTION AND VOICE COMMANDS

(75) Inventors: Jeffrey J. Jacobsen, Hollister, CA (US); Christopher Parkinson, Richland, WA (US); Stephen A. Pombo, Campbell, CA (US)

(73) Assignee: Kopin Corporation, Westborough, MA (US)

( * ) Notice: Subject to any disclaimer, the term of this patent is extended or adjusted under 35 U.S.C. 154(b) by 28 days.

(21) Appl. No.: 12/774,179

(22) Filed: May 5, 2010

(65) Prior Publication Data

US 2011/0001699 A1  Jan. 6, 2011

Related U.S. Application Data

(60) Provisional application No. 61/176,662, filed on May 8, 2009, provisional application No. 61/237,884, filed on Aug. 28, 2009.

(51) Int. Cl.
*G06F 3/01* (2006.01)

(52) U.S. Cl.
CPC ............... *G06F 3/013* (2013.01); *G06F 3/012* (2013.01); *G06F 3/017* (2013.01)

(58) Field of Classification Search
CPC ................................ G06F 3/012; G06F 3/017
USPC ............................... 348/8; 345/156; 455/566
See application file for complete search history.

(56) References Cited

U.S. PATENT DOCUMENTS

| | | | |
|---|---|---|---|
| 5,005,213 A | 4/1991 | Hanson et al. | |
| 5,594,469 A | 1/1997 | Freeman et al. | |
| 5,990,793 A | 11/1999 | Bieback | |
| 6,010,216 A | 1/2000 | Jesiek | |
| 6,084,556 A | 7/2000 | Zwern | |
| 6,108,197 A | 8/2000 | Janik | |
| 6,198,462 B1 | 3/2001 | Daily et al. | |
| 6,204,974 B1 | 3/2001 | Spitzer | |
| 6,313,864 B1 | 11/2001 | Tabata et al. | |
| 6,325,507 B1 | 12/2001 | Jannard et al. | |
| 6,369,952 B1 | 4/2002 | Rallison et al. | |
| 6,778,906 B1 | 8/2004 | Hennings et al. | |
| 6,798,391 B2 | 9/2004 | Peterson, III | |
| 6,853,293 B2 | 2/2005 | Swartz et al. | |
| 6,900,777 B1 | 5/2005 | Hebert et al. | |
| 6,922,184 B2 | 7/2005 | Lawrence et al. | |

(Continued)

FOREIGN PATENT DOCUMENTS

| | | |
|---|---|---|
| CN | 1797299 A | 7/2006 |
| CN | 101581969 A | 11/2009 |

(Continued)

OTHER PUBLICATIONS

International Preliminary Report on Patentability from PCT/US2010/033738 dated Sep. 20, 2011.

(Continued)

*Primary Examiner* — David Bilodeau
(74) *Attorney, Agent, or Firm* — Hamilton, Brook, Smith & Reynolds, P.C.

(57) ABSTRACT

A remote control microdisplay device that uses hand and head movement and voice commands to control the parameters of a field of view for the microdisplay within a larger virtual display area associated with a host application.

18 Claims, 25 Drawing Sheets

(56) References Cited

U.S. PATENT DOCUMENTS

| | | | |
|---|---|---|---|
| 6,956,614 B1 | 10/2005 | Quintana et al. | |
| 6,966,647 B2 | 11/2005 | Jannard et al. | |
| 7,004,582 B2 | 2/2006 | Jannard et al. | |
| 7,013,009 B2 | 3/2006 | Warren | |
| 7,082,393 B2 | 7/2006 | Lahr | |
| 7,147,324 B2 | 12/2006 | Jannard et al. | |
| 7,150,526 B2 | 12/2006 | Jannard et al. | |
| 7,213,917 B2 | 5/2007 | Jannard et al. | |
| 7,216,973 B2 | 5/2007 | Jannard et al. | |
| 7,219,994 B2 | 5/2007 | Jannard et al. | |
| 7,231,038 B2 | 6/2007 | Warren | |
| 7,249,846 B2 | 7/2007 | Grand et al. | |
| 7,278,734 B2 | 10/2007 | Jannard et al. | |
| 7,331,666 B2 | 2/2008 | Swab et al. | |
| 7,445,332 B2 | 11/2008 | Jannard et al. | |
| 7,452,073 B2 | 11/2008 | Jannard et al. | |
| 7,458,682 B1 | 12/2008 | Lee | |
| 7,461,936 B2 | 12/2008 | Jannard | |
| 7,494,216 B2 | 2/2009 | Jannard et al. | |
| 7,501,995 B2 | 3/2009 | Morita et al. | |
| 7,512,414 B2 | 3/2009 | Jannard et al. | |
| 7,620,432 B2 | 11/2009 | Willins et al. | |
| 7,620,433 B2 | 11/2009 | Bodley | |
| 7,682,018 B2 | 3/2010 | Jannard | |
| 7,740,353 B2 | 6/2010 | Jannard | |
| 8,108,143 B1 | 1/2012 | Tester | |
| 8,170,262 B1 | 5/2012 | Liu | |
| 8,184,983 B1* | 5/2012 | Ho et al. | 398/130 |
| 8,577,427 B2 | 11/2013 | Serota | |
| 8,855,719 B2 | 10/2014 | Jacobsen et al. | |
| 8,929,954 B2 | 1/2015 | Jacobsen et al. | |
| 9,122,307 B2 | 9/2015 | Jacobsen et al. | |
| 2001/0003712 A1 | 6/2001 | Roelofs | |
| 2002/0015008 A1 | 2/2002 | Kishida et al. | |
| 2002/0030649 A1 | 3/2002 | Zavracky et al. | |
| 2002/0044152 A1 | 4/2002 | Abbott, III et al. | |
| 2002/0065115 A1 | 5/2002 | Lindholm | |
| 2002/0094845 A1 | 7/2002 | Inasaka | |
| 2002/0154070 A1 | 10/2002 | Sato et al. | |
| 2003/0065805 A1 | 4/2003 | Barnes, Jr. | |
| 2003/0067536 A1 | 4/2003 | Boulanger et al. | |
| 2003/0068057 A1 | 4/2003 | Miller et al. | |
| 2004/0113867 A1 | 6/2004 | Tomine et al. | |
| 2004/0193413 A1* | 9/2004 | Wilson et al. | 704/243 |
| 2004/0210852 A1 | 10/2004 | Balakrishnan et al. | |
| 2004/0267527 A1 | 12/2004 | Creamer et al. | |
| 2005/0114140 A1 | 5/2005 | Brackett et al. | |
| 2005/0237296 A1* | 10/2005 | Lee | 345/156 |
| 2005/0245292 A1 | 11/2005 | Bennett et al. | |
| 2005/0264527 A1 | 12/2005 | Lin | |
| 2006/0028400 A1 | 2/2006 | Lapstun et al. | |
| 2006/0061551 A1 | 3/2006 | Fateh | |
| 2006/0109237 A1* | 5/2006 | Morita et al. | 345/156 |
| 2006/0132382 A1 | 6/2006 | Jannard | |
| 2006/0166705 A1 | 7/2006 | Seshadri et al. | |
| 2006/0178085 A1 | 8/2006 | Sotereanos et al. | |
| 2006/0221266 A1 | 10/2006 | Kato et al. | |
| 2007/0009125 A1 | 1/2007 | Frerking et al. | |
| 2007/0030174 A1 | 2/2007 | Randazzo et al. | |
| 2007/0053544 A1 | 3/2007 | Jhao et al. | |
| 2007/0093279 A1 | 4/2007 | Janik | |
| 2007/0103388 A1 | 5/2007 | Spitzer | |
| 2007/0180979 A1 | 8/2007 | Rosenberg | |
| 2007/0220108 A1 | 9/2007 | Whitaker | |
| 2007/0238475 A1 | 10/2007 | Goedken | |
| 2007/0265495 A1 | 11/2007 | Vayser | |
| 2008/0055194 A1 | 3/2008 | Baudino et al. | |
| 2008/0084992 A1 | 4/2008 | Peddireddy et al. | |
| 2008/0120141 A1 | 5/2008 | Kariathungal et al. | |
| 2008/0144854 A1 | 6/2008 | Abreu | |
| 2008/0180640 A1 | 7/2008 | Ito | |
| 2008/0198324 A1 | 8/2008 | Fuziak | |
| 2008/0200774 A1 | 8/2008 | Luo | |
| 2008/0239080 A1 | 10/2008 | Moscato | |
| 2009/0002640 A1 | 1/2009 | Yang et al. | |
| 2009/0079839 A1 | 3/2009 | Fischer et al. | |
| 2009/0093304 A1 | 4/2009 | Ohta | |
| 2009/0099836 A1 | 4/2009 | Jacobsen et al. | |
| 2009/0117890 A1 | 5/2009 | Jacobsen et al. | |
| 2009/0128448 A1 | 5/2009 | Riechel | |
| 2009/0154719 A1 | 6/2009 | Wulff et al. | |
| 2009/0180195 A1 | 7/2009 | Cakmakci et al. | |
| 2009/0182562 A1 | 7/2009 | Claire et al. | |
| 2009/0204410 A1 | 8/2009 | Mozer et al. | |
| 2009/0251409 A1* | 10/2009 | Parkinson et al. | 345/156 |
| 2010/0020229 A1 | 1/2010 | Hershey et al. | |
| 2010/0033830 A1 | 2/2010 | Yung | |
| 2010/0053069 A1 | 3/2010 | Tricoukes et al. | |
| 2010/0117930 A1 | 5/2010 | Bacabara et al. | |
| 2010/0128626 A1 | 5/2010 | Anderson et al. | |
| 2010/0141554 A1 | 6/2010 | Devereaux et al. | |
| 2010/0156812 A1 | 6/2010 | Stallings et al. | |
| 2010/0164990 A1 | 7/2010 | Van Doorn | |
| 2010/0182137 A1 | 7/2010 | Pryor | |
| 2010/0245585 A1 | 9/2010 | Fisher et al. | |
| 2010/0250231 A1 | 9/2010 | Almagro | |
| 2010/0302137 A1 | 12/2010 | Benko et al. | |
| 2010/0306711 A1 | 12/2010 | Kahn et al. | |
| 2010/0309295 A1 | 12/2010 | Chow | |
| 2011/0001699 A1 | 1/2011 | Jacobsen et al. | |
| 2011/0092825 A1 | 4/2011 | Gopinathan et al. | |
| 2011/0134910 A1 | 6/2011 | Chao-Suren et al. | |
| 2011/0187640 A1* | 8/2011 | Jacobsen et al. | 345/156 |
| 2012/0068914 A1* | 3/2012 | Jacobsen et al. | 345/8 |
| 2012/0075177 A1* | 3/2012 | Jacobsen et al. | 345/156 |
| 2012/0089392 A1 | 4/2012 | Larco et al. | |
| 2012/0110456 A1 | 5/2012 | Larco et al. | |
| 2012/0166203 A1 | 6/2012 | Fuchs et al. | |
| 2012/0236025 A1 | 9/2012 | Jacobsen et al. | |
| 2012/0287284 A1 | 11/2012 | Jacobsen et al. | |
| 2012/0302288 A1 | 11/2012 | Born et al. | |
| 2013/0070930 A1 | 3/2013 | Johnson | |
| 2013/0174205 A1 | 7/2013 | Jacobsen et al. | |
| 2013/0231937 A1 | 9/2013 | Woodall et al. | |
| 2013/0288753 A1 | 10/2013 | Jacobsen et al. | |
| 2013/0289971 A1 | 10/2013 | Parkinson | |
| 2013/0300649 A1 | 11/2013 | Parkinson et al. | |
| 2014/0003616 A1 | 1/2014 | Johnson et al. | |
| 2014/0059263 A1 | 2/2014 | Rosenberg et al. | |
| 2014/0093103 A1 | 4/2014 | Breece et al. | |
| 2014/0235169 A1 | 8/2014 | Parkinson et al. | |
| 2014/0368412 A1 | 12/2014 | Jacobsen et al. | |
| 2015/0039311 A1 | 2/2015 | Clark et al. | |

FOREIGN PATENT DOCUMENTS

| | | |
|---|---|---|
| CN | 101599267 A | 12/2009 |
| WO | WO 95/21408 | 8/1995 |
| WO | WO 95/23994 | 9/1995 |
| WO | WO 2009/076016 | 6/2009 |
| WO | WO 2009/120984 A1 | 10/2009 |
| WO | WO 2010/129679 A1 | 11/2010 |
| WO | WO 2011/051660 | 5/2011 |
| WO | WO 2011/097226 | 8/2011 |
| WO | WO 2011/114149 A1 | 9/2011 |
| WO | WO 2012/040107 A1 | 3/2012 |
| WO | WO 2012/040386 | 3/2012 |

OTHER PUBLICATIONS

Notification of Transmittal of International Search Report and Written Opinion of PCT/US2012/037284 dated Oct. 1, 2012.

International Preliminary Report on Patentability from PCT/US2011/023337 dated Aug. 16, 2012.

Notification of Transmittal of International Search Report and Written Opinion of PCT/US2012/068686, Date of Mailing: Mar. 25, 2013, 11 pages.

Notification of Transmittal of the International Search Report and the Written Opinion of the International Searching Authority, or the Declaration, Date of Mailing: Dec. 5, 2013 in re: PCT/US2013/036221, Title Headset Computer (HSC) As Auxiliary Display With ASR and HT Input.

(56) References Cited

OTHER PUBLICATIONS

International Search Report and Written Opinion for PCT/US2013/065927 dated Mar. 21, 2014, entitled "Improved Headset Computer Operation Using Vehicle Sensor Feedback for Remote Control Vehicle".

Morphew, M.E., et al., "Helmet Mounted Displays for Unmanned Aerial Vehicle Control", Proceedings of SPIE, vol. 5442, Oct. 20, 2004.

Notification Concerning Transmittal of International Preliminary Report on Patentability of PCT/US2012/037284, "Headset Computer That Uses Motion and Voices to Control Information Display and Remote Devices", Date of Mailing: Nov. 21, 2013, 7 pages.

EP 12782481.1 Supplemental European Search Report, "Context Sensitive Overlays in Voice Controlled Headset Computer Displays," dated Sep. 29, 2014.

European Search Report for EP 12782481.1 dated Sep. 29, 2014.

Notification Concerning Transmittal of International Preliminary Report on Patentability and International Preliminary Report on Patentability, PCT/US2013/041070, "Controlled Headset Computer Displays", date of mailing Jul. 16, 2015.

* cited by examiner move cursor mode
  up, down, left, right pan / zoom mode
  pan up, down, left, right...
  zoom in, out, 5x, 10x....

select, bold, highlight, underline

FIG. 7A

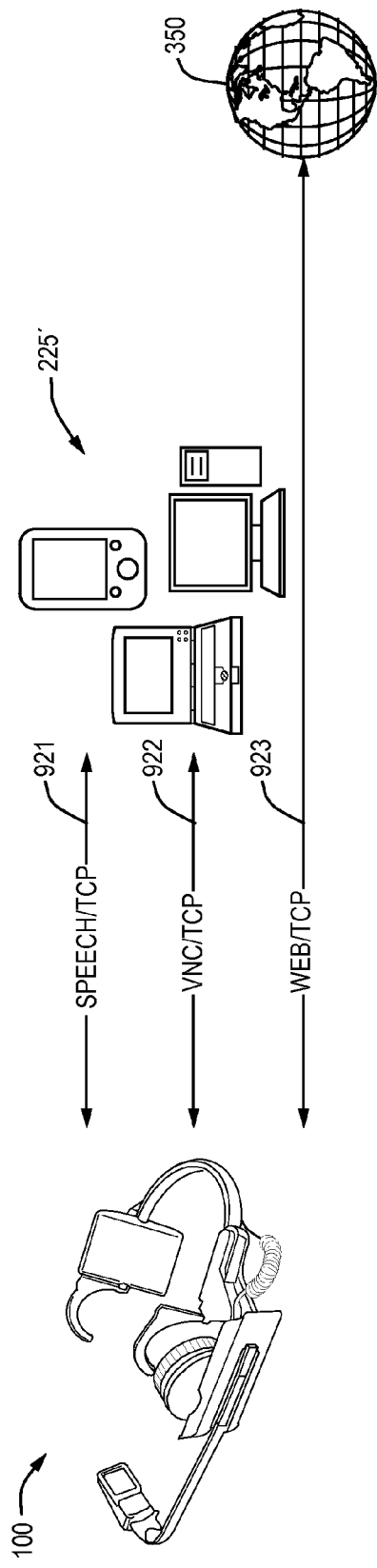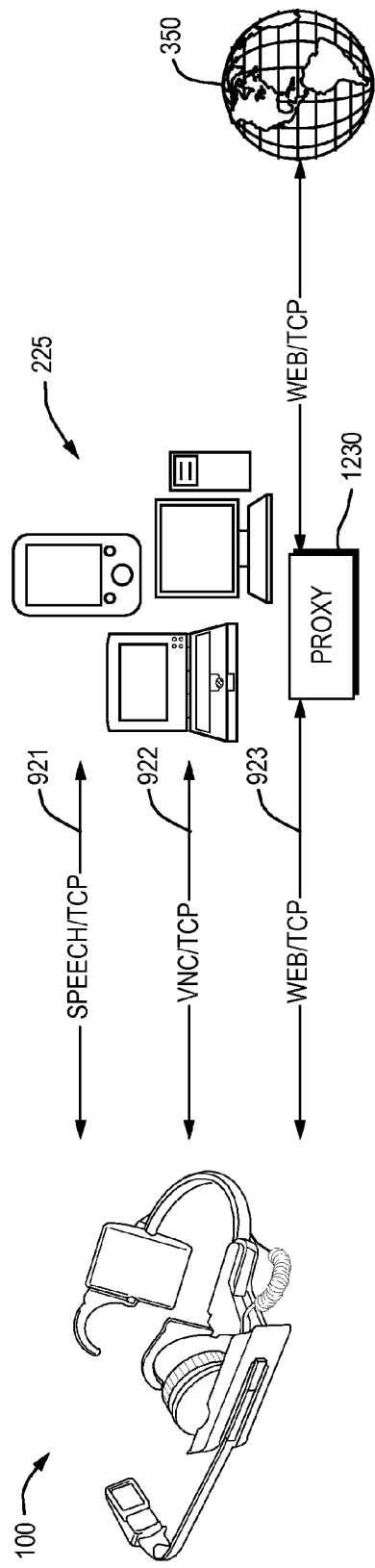
FIG. 16A
FIG. 16B

REMOTE CONTROL OF HOST APPLICATION USING MOTION AND VOICE COMMANDS

CROSS REFERENCE TO RELATED APPLICATION

This application claims the benefit of U.S. Provisional Application No. 61/176,662, filed on May 8, 2009 entitled "Remote Control of Host Application Using Tracking and Voice Commands" and U.S. Provisional Application No. 61/237,884, filed on Aug. 28, 2009 entitled "Remote Control of Host Application Using Motion and Voice Commands". The entire teachings of the above applications are incorporated herein by reference.

BACKGROUND OF THE INVENTION

The present application relates to human/computer interfaces and more particularly to a remote control/microdisplay device that accepts voice commands and tracks hand motions and/or head movements to provide access to application software such as executing on a remote host device.

Small, portable electronic devices capable of storing and displaying large amounts of high resolution computer graphic information and even video content continue to be increasingly popular. These devices, such as the Apple iPhone™, represent a significant trend towards convergence among mobile phones, portable computers and digital media players. (iPhone is a trademark of Apple Computer, Inc. of Cupertino, Calif.) While these devices typically include a display screen, the visual experience of a high resolution, large format display cannot be easily replicated in such devices because of their physical size limitations.

As a result, consumers are now seeking a high quality, portable, color display to augment their handheld devices. One such device is a head mounted eyewear device which is worn on the user's face or head similar to a pair of eyeglasses or headphones. Another example is a hand-held viewing device. These devices include a small high resolution microdisplay and lens to magnify the image. A wireless interface provides great convenience and mobility to such devices. The micro-displays can provide Super Video Graphics Array (SVGA) (800×600) resolution or even Extended Graphics Array (XGA) (1024×768) or higher resolution. For more information regarding such displays, see a co-pending patent application entitled "Mobile Wireless Display Software Platform for Controlling Other systems and Devices", U.S. application Ser. No. 12/348,648 filed Jan. 5, 2009 and "Handheld Wireless Display Devices Having High Resolution Display Suitable for Use as Mobile Internet Device", PCT International Application No. PCT/US09/38601 filed Mar. 27, 2009.

SUMMARY OF THE DISCLOSURE

A remote control microdisplay device that uses an input device such as a head tracking accelerometer or a camera to detect movements such as head movements, hand motions and/or gestures, with optional voice commands, to control the parameters of a field of view for the microdisplay such as a field of view within a larger virtual display area associated with a host application.

The display may be embodied in various forms, as a monocular display in a headset, as a binocular display in an eyewear device, or in other handheld devices.

BRIEF DESCRIPTION OF THE DRAWINGS

The foregoing will be apparent from the following more particular description of example embodiments, as illustrated in the accompanying drawings in which like reference characters refer to the same parts throughout the different views. The drawings are not necessarily to scale, emphasis instead being placed upon illustrating embodiments.

FIG. 7A is a list of typical commands, including screen commands and application specific commands.

FIGS. 16A-16B are diagrams illustrating differences between a traditional Transmission Control Protocol (TCP) connection and a proxied TCP connection over a Bluetooth™ connection.

DETAILED DESCRIPTION OF PREFERRED EMBODIMENTS

A description of example embodiments follows.

The teachings of all patents, published applications and references cited herein are incorporated by reference in their entirety.

Figure 1A:
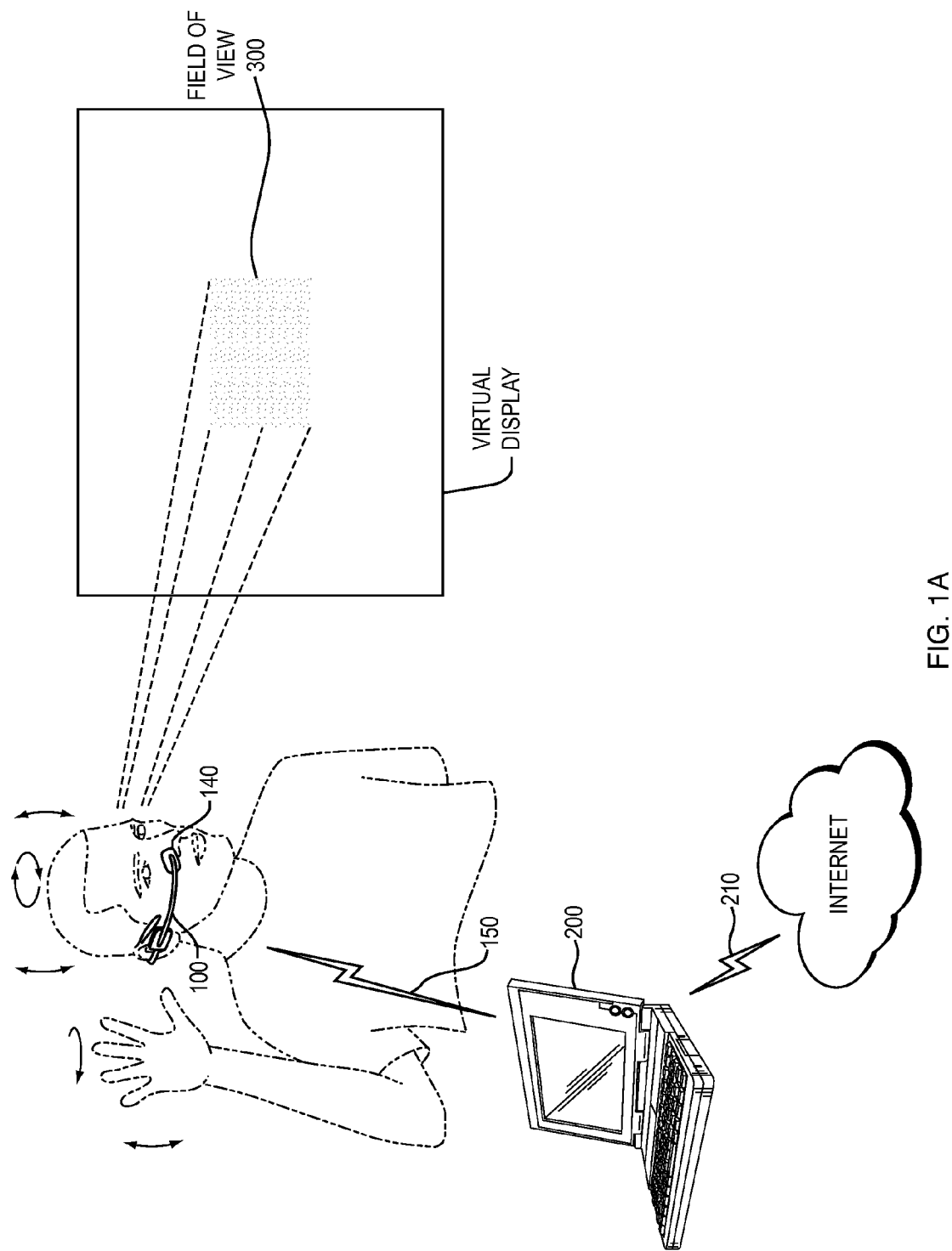
FIG. 1A is a high level diagram showing a head mounted remote control/display device, and a person using hand gestures an/or head movements to control a host computer, virtual display and field of view.

FIG. 1A shows a remote control wireless display device 100 that incorporates a high resolution (VGA or better) microdisplay element 140. Audio input and/or output devices, including microphone input and output speakers, are included in an associated housing (not shown in FIG. 1A). Also located within the housing are various electronic circuits including, as will be understood shortly, a microcomputer, wireless interface, associated memory or other storage devices, a camera (optical sensor) and/or motion sensors. The camera and/or motion sensors are used to track the motion of the user's head or hands in at least a first axis 111 (horizontal), but preferably also a second (vertical) 112 and a third (tilt) 113 axis.

The device 100 is used as a remote control for a host computing device 200. The host 200 may be, for example, a laptop, cell phone, Blackberry, iPhone™, or other computing device having greater computational complexity than the remote control device 100. The host 200 may be further connected to other networks such as through a wireless connection 210 to the Internet. The remote control 100 and host 200 are connected via a suitable wireless connection such as provided by a Bluetooth link 150.

According to aspects that will be explained in more detail below, the remote control device 100 allows a user to select a field of view 300 within a much larger area defined by a virtual display. The user can typically control the position, extent (e.g., X-Y range), and/or magnification of the field of view 300.

While what is shown in FIG. 1A is a monocular microdisplay presenting a single fixed display element 140 supported on the face of the user with a cantilevered boom 160, it should be understood that other configurations for the remote control display device 100 are possible.

Figure 1B:
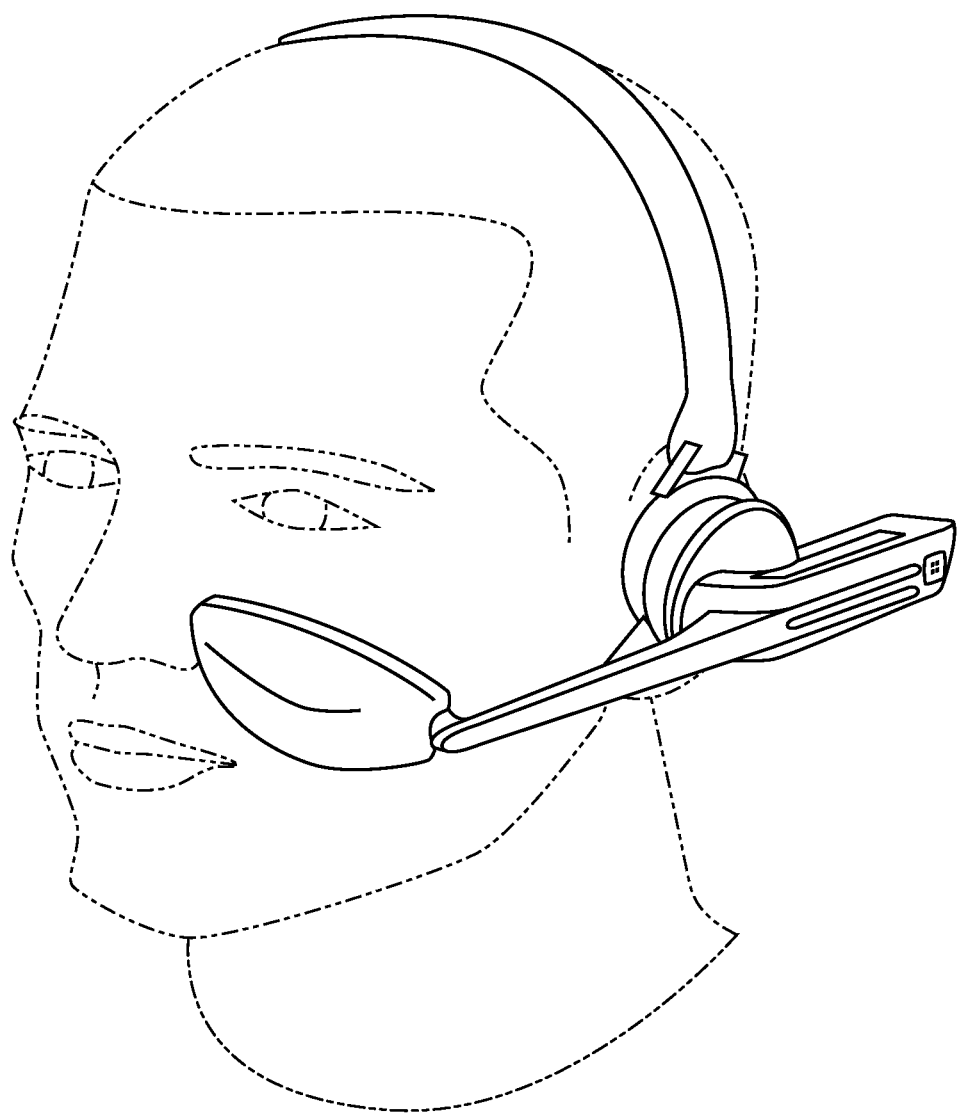
FIG. 1B is an embodiment using a head strap.

For example, in the embodiment of FIG. 1B, a monocular display 120 and cantilever 171 may be supported on the user's head with a strap 172 to provide stable positioning of the display pod with respect to the eye. The use of strap also makes it easy to adjust for a different head shape.

Figure 1C:
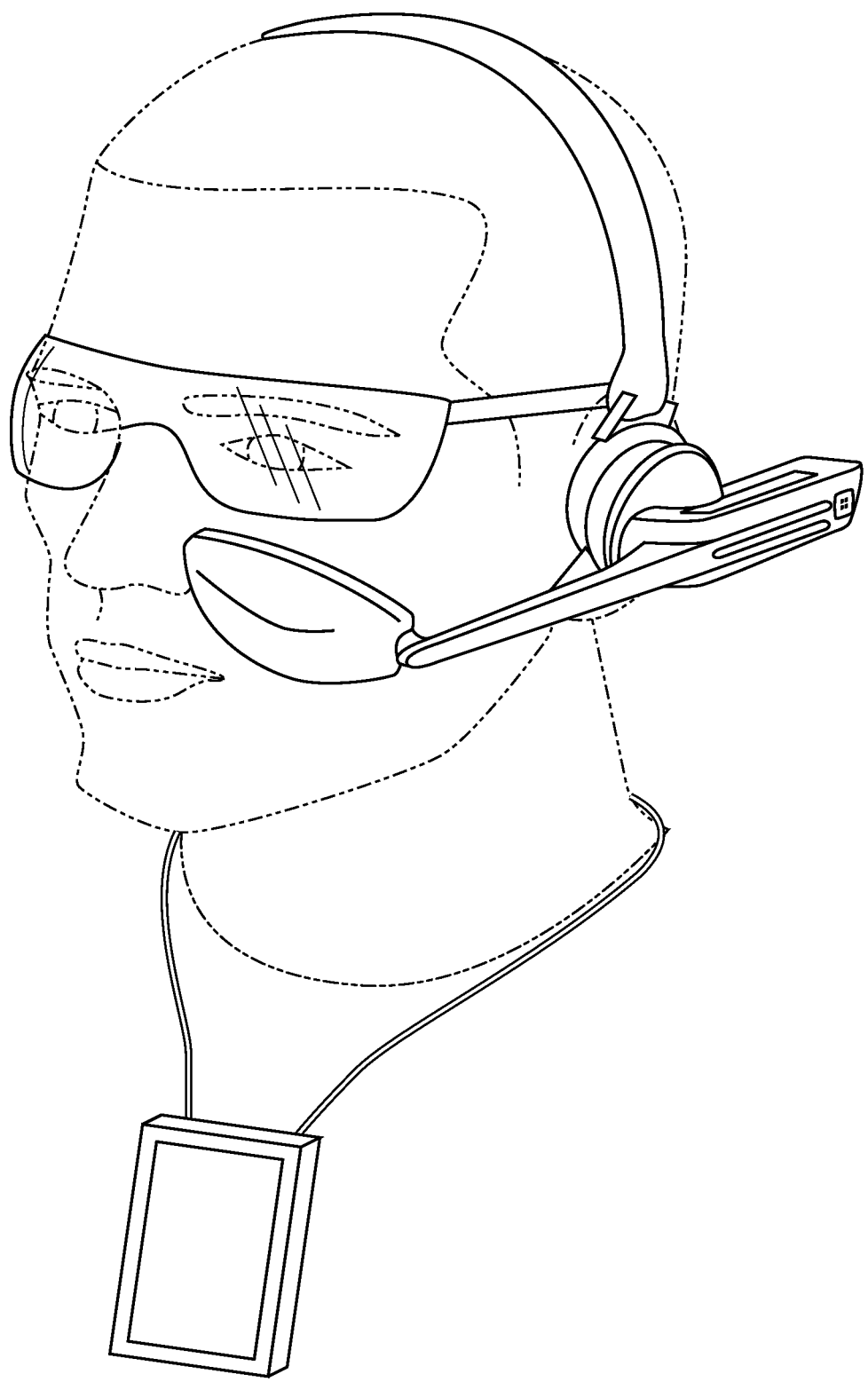
FIG. 1C is a binocular embodiment.

FIG. 1C shows another embodiment using a "two-eye", binocular arrangement wherein two microdisplay elements 181, 182 are presented to the user. The electronics and/or battery can be placed in a lanyard 183 or in a housing 184 at the back to reduce the size and weight of the pod. The lanyard 183 also can provide a counter weight to the display modules and move the center of gravity of the wireless display device toward the center of the head.

Figure 2:
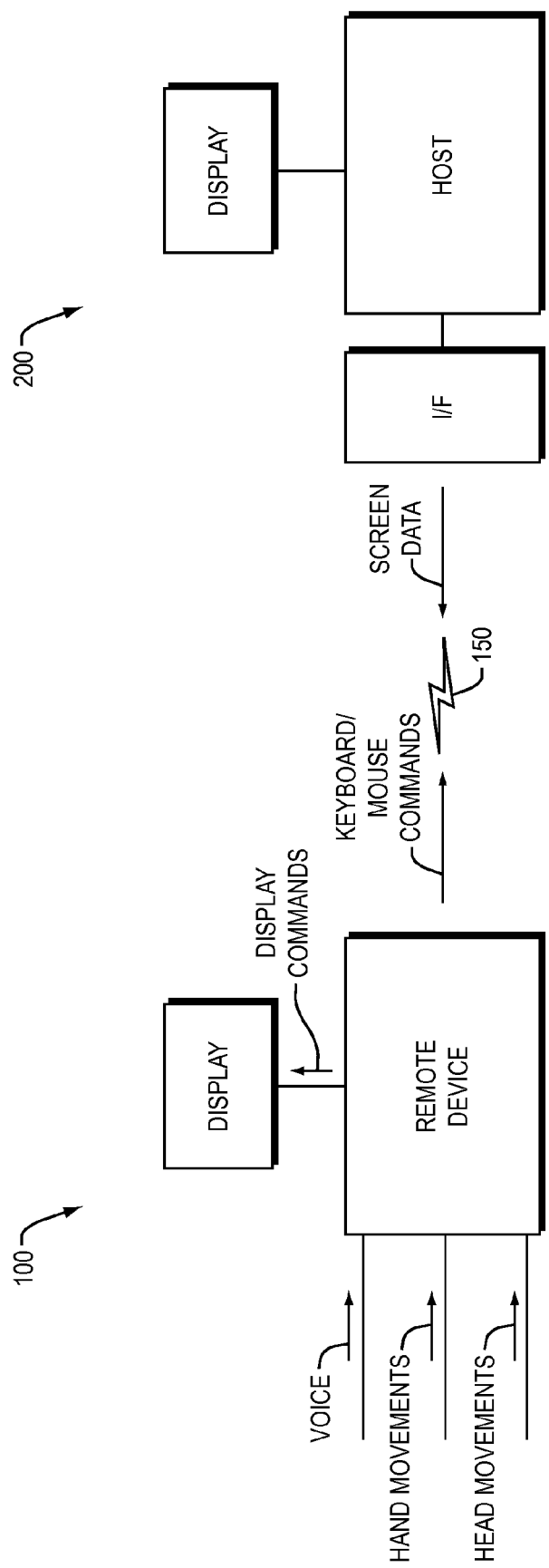
FIG. 2 is a high level block diagram of the remote control device and host illustrating how voice, hand gesture and head tracking commands are translated to keyboard and mouse commands.

FIG. 2 is a block diagram showing more detail of the remote control display 100, host 200 and the data that travels between them. The remote control display 100 receives voice input from the user via the microphone, hand movements via the camera or optical sensor(s), and head movement inputs via the head tracking circuitry. These are translated by software in the remote device 100 into keyboard and/or mouse commands that are then sent over the Bluetooth interface 150 to the host 200. The host 200 then interprets these translated commands in accordance with its own operating system/application software to perform various functions. Among the commands is one to select a field of view 300 within the virtual display and return that selected screen data to the remote device. Thus, it should be understood that a very large format virtual display area might be associated with application software or an operating system running on the host 200. However, only a portion of that large virtual display area within the field of view 300 is returned to and actually displayed by the remote control display device 100.

Figure 3A:
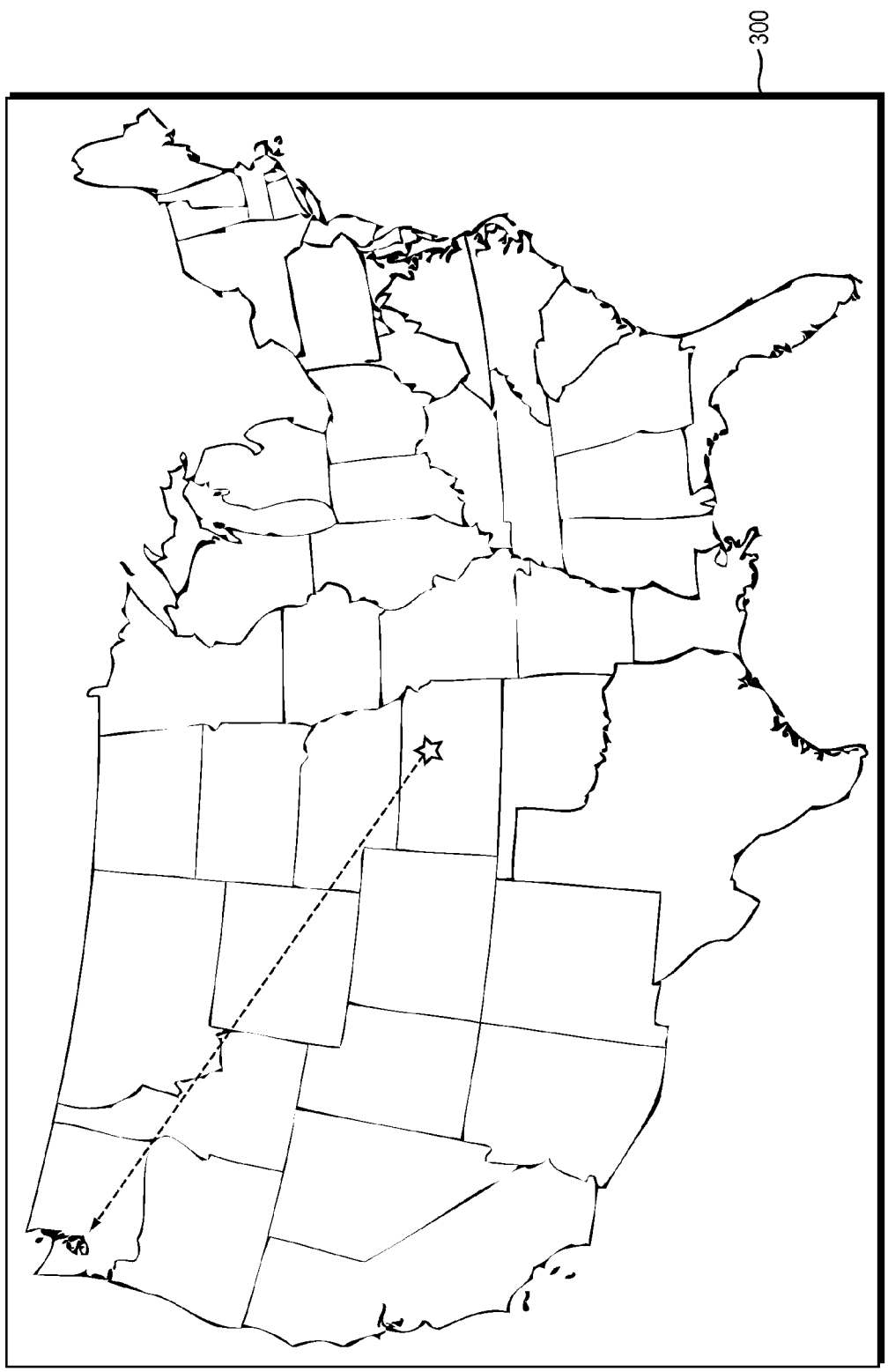
FIGS. 3A and 3B illustrate how a combination of voice and head tracking commands manipulate the field of view within the virtual display.
Figure 3B:
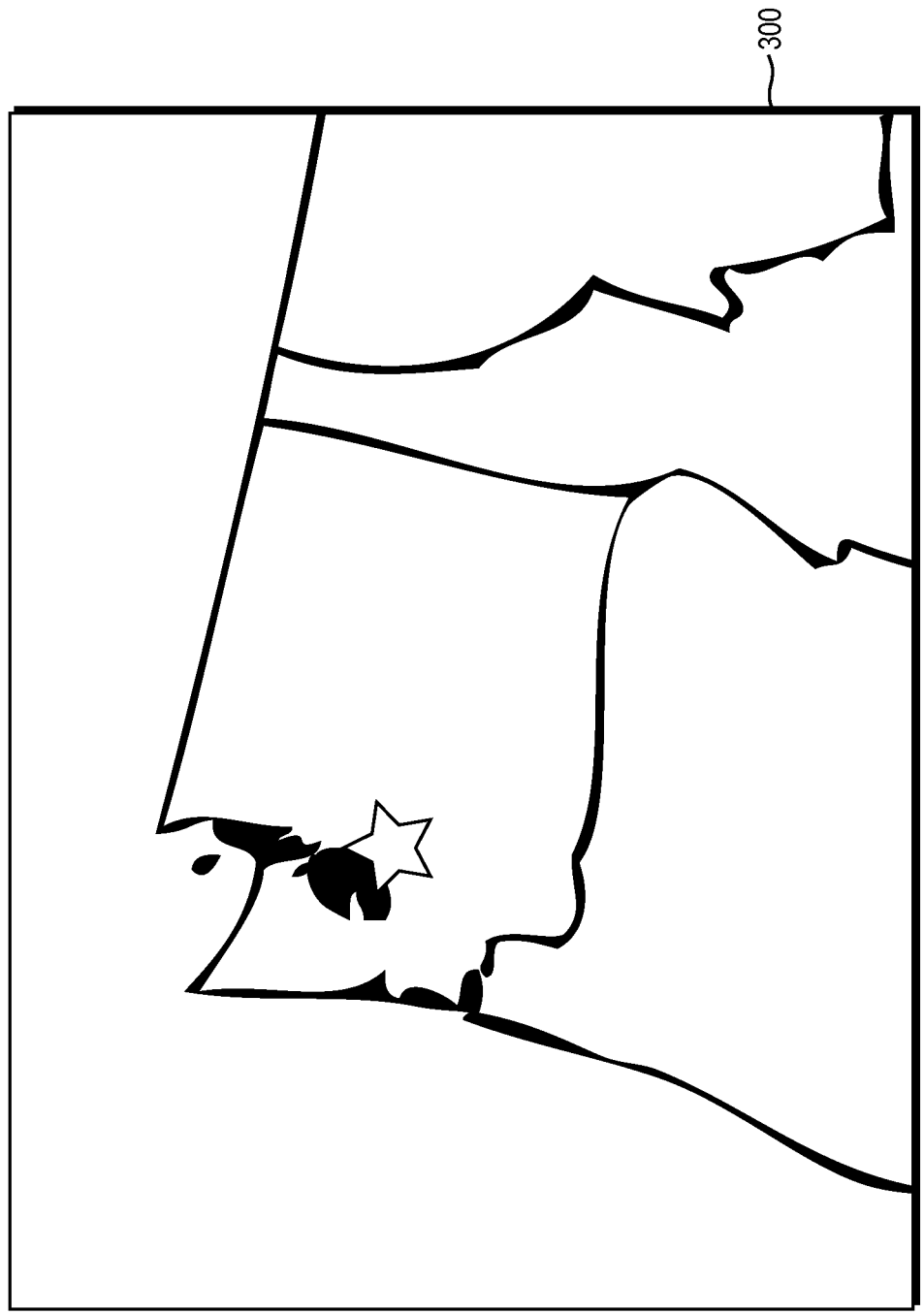

FIGS. 3A and 3B are an example of where the virtual display area on host 200 may include a detailed map of the United States. A user may initially see the entire virtual display area on the microdisplay 140, albeit at reduced resolution. As shown in FIG. 3A, the field of view is thus initially centered at a low magnification on a central cursor point or location, such as on the map at Lawrence, Kans. The user then moves his head or makes a hand gesture to view an area of specific interest in some detail. The hand gesture may be a diagonal sweeping motion. The head movement may be to the left and then up or may be a straight diagonal movement over to an area of interest for the user. For example, the user may now be interested in the area surrounding Seattle, Wash. and has moved his/her head there. With a corresponding voice command such as "zoom in", the presented virtual display area is then zoomed in to see the area around Seattle in more detail on the microdisplay, as in FIG. 3B. This may optionally be all the while the original entire United States area is still being presented by the host.

It is also possible to switch back and forth between the original entire United States area and the area around Seattle by voice command. Alternatively the switch can be between any two zoom levels or any two different locations in the map.

Figure 4A:
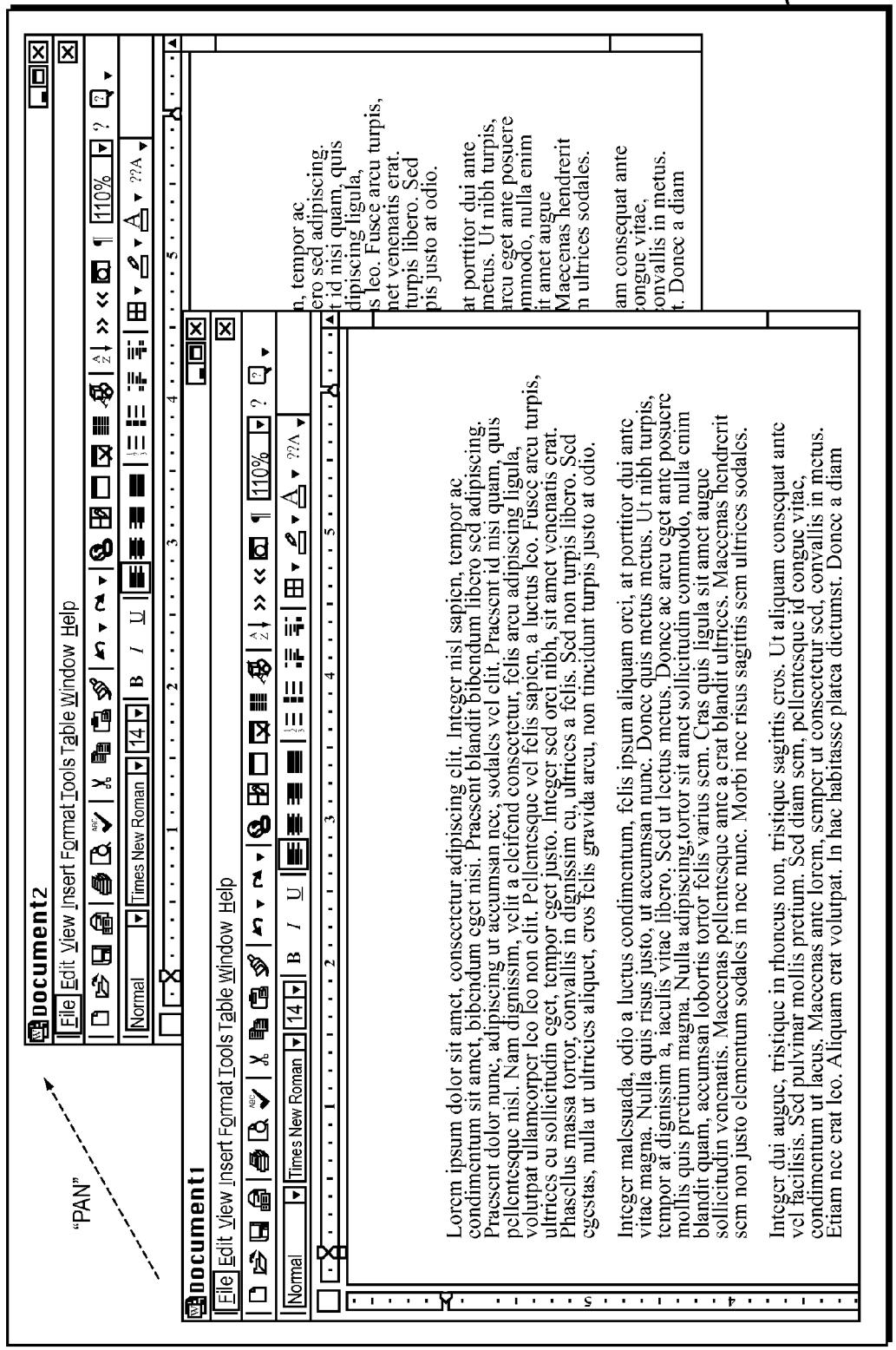
FIGS. 4A and 4B are another example of using voice and head movement commands.
Figure 4B:
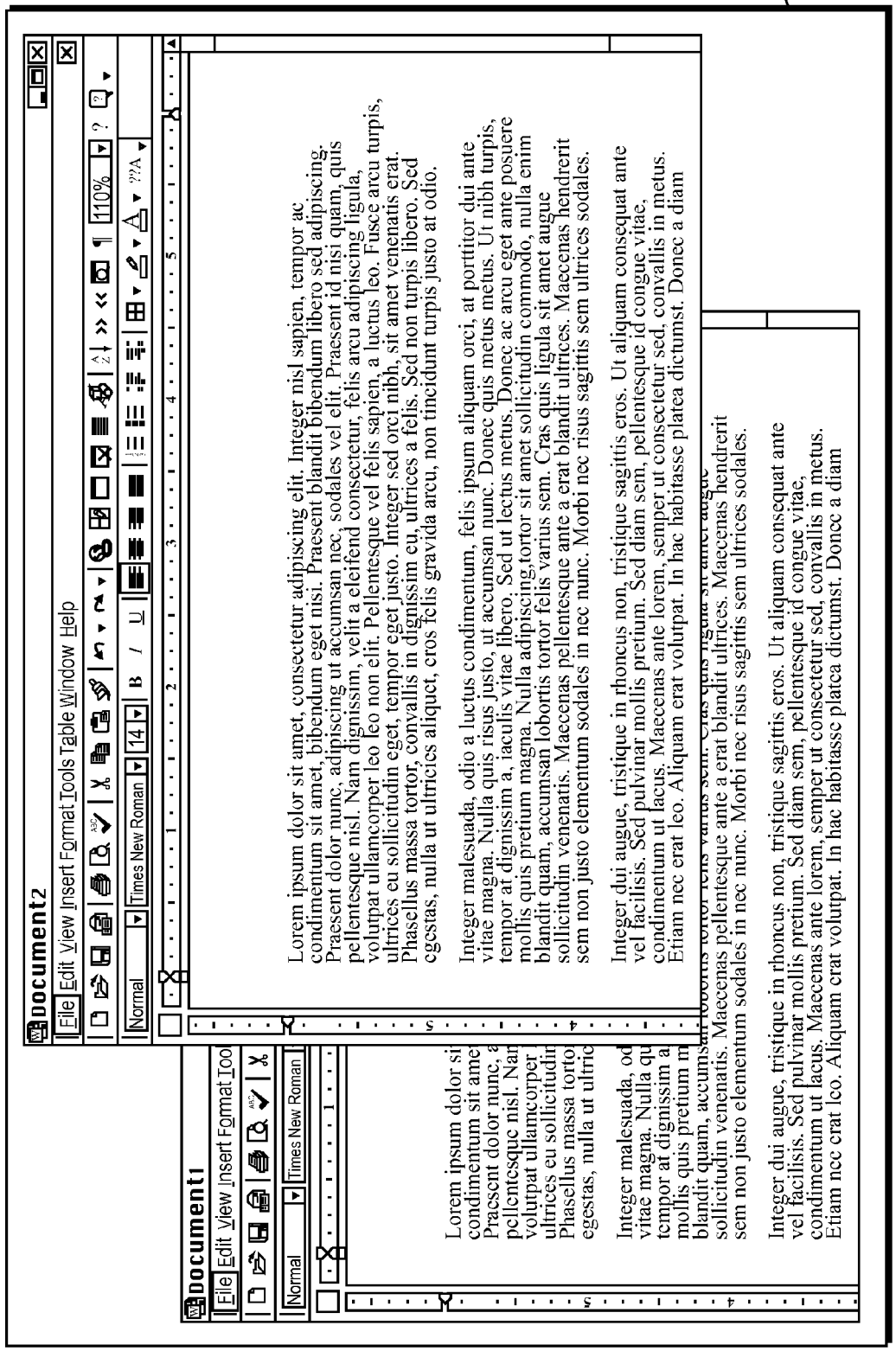

FIGS. 4A and 4B are a more detailed view of how a typical host computer 200 display may be controlled by the remote device 100. A user initially sees a center portion of the screen and may select one of two modes: either (a) move cursor mode or (b) pan/zoom mode. Selecting the first of these modes with a voice command, the user can use hand gestures or head movements to cause the cursor to move around (left, right, up, down) within the virtual display. Thus, as shown in FIG. 4A, for example, with the field of view originally centered on the Microsoft Outlook email window the user in this mode may use a hand or head movement to position the cursor over a particular email message to read. The user may then say a command, such as "SELECT" to cause the email message to appear in the display pane.

However, the user may then issue another voice command such as "SELECT PAN" causing the screen to pan out, allow the user to better see a different part of the screen such as a portion of the Microsoft Word document window sitting behind the Outlook window. Using the hand or head movements and speaking a "SELECT" voice command, the user may then change the field of view so that the Microsoft Word document appears in front. See FIG. 4B.

Figure 5:
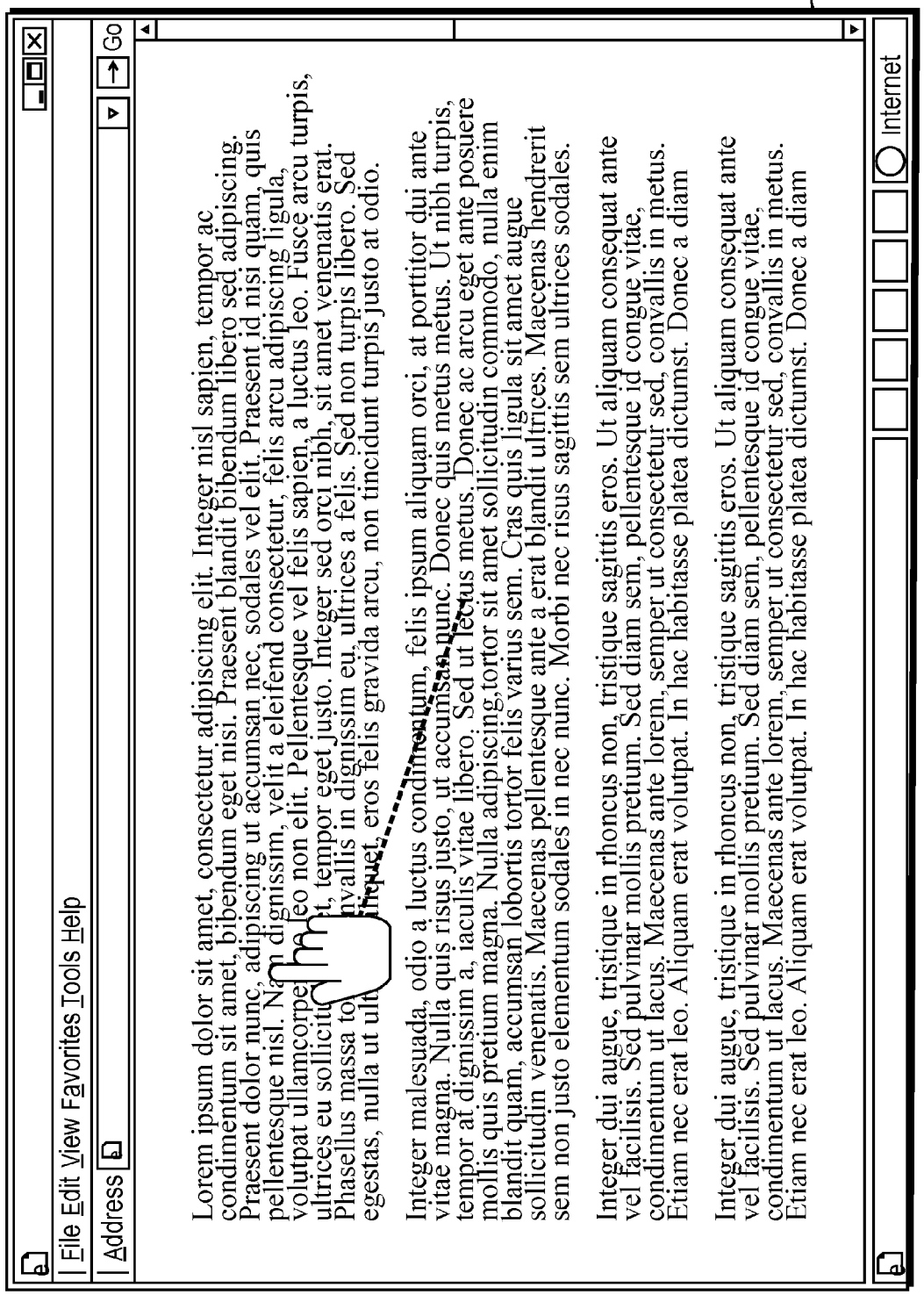
FIG. 5 illustrates a web browsing example using voice and head movement commands.

FIG. 5 is a similar example of using hand or head movements and voice commands to navigate web pages using a web browser. Here the user can select the move mode and use hand or head movements to position the cursor at a particular hyperlink of interest. Using the voice command "SELECT", the selected hyperlink e.g., "About USPTO" is then activated. The browser then moves forward to the selected web page.

Thus, using hand or head movements, the user can select from among multiple hyperlinks displayed on a web page, and using a voice command, then cause that hyperlink to be selected. Other combinations of hand/head movements and voice commands may cause web pages to be scrolled up and down, page back or forward, or implement other typical web browser commands.

Figure 6A:
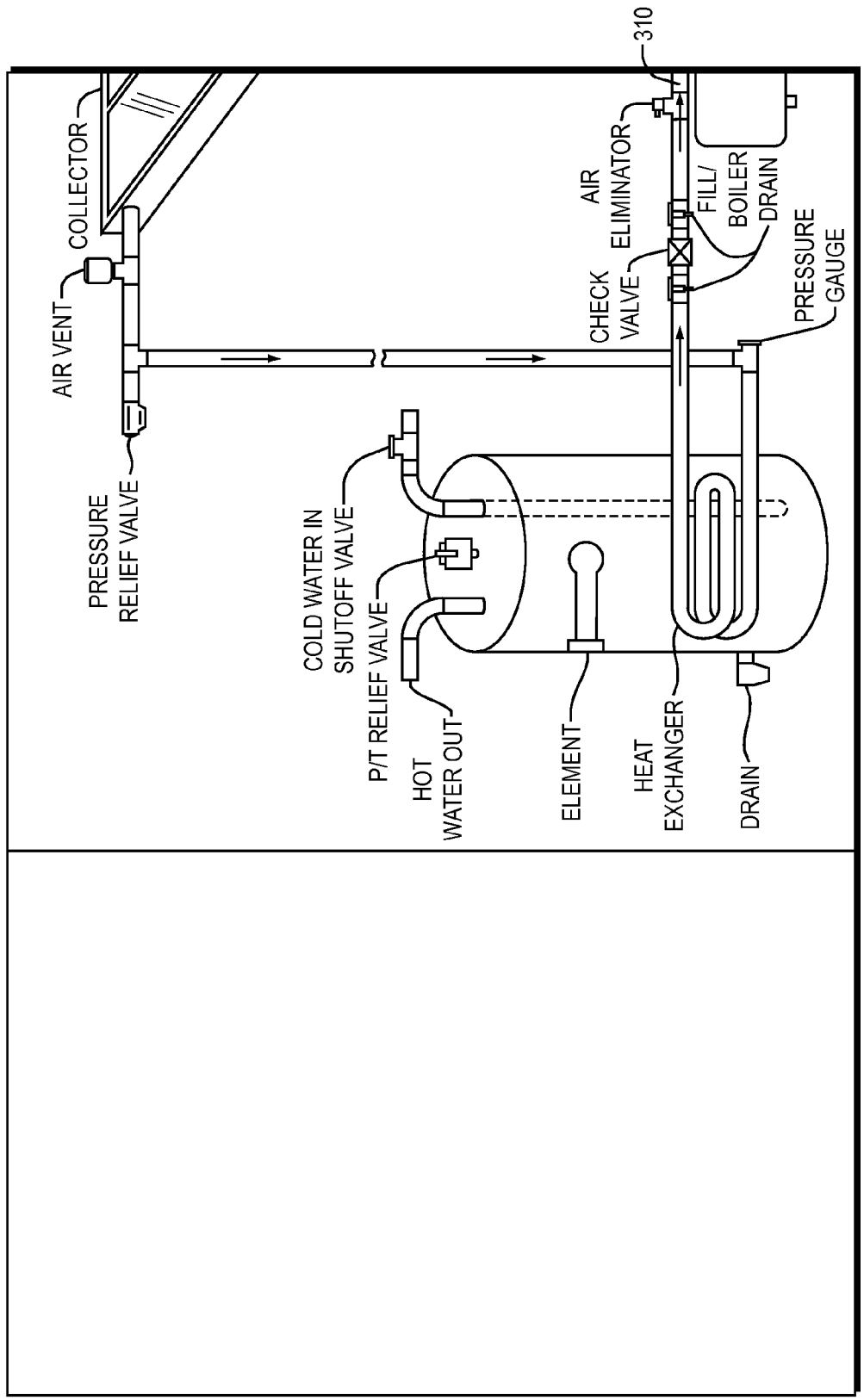
FIGS. 6A and 6B are another example of navigating an architectural drawing.
Figure 6B:
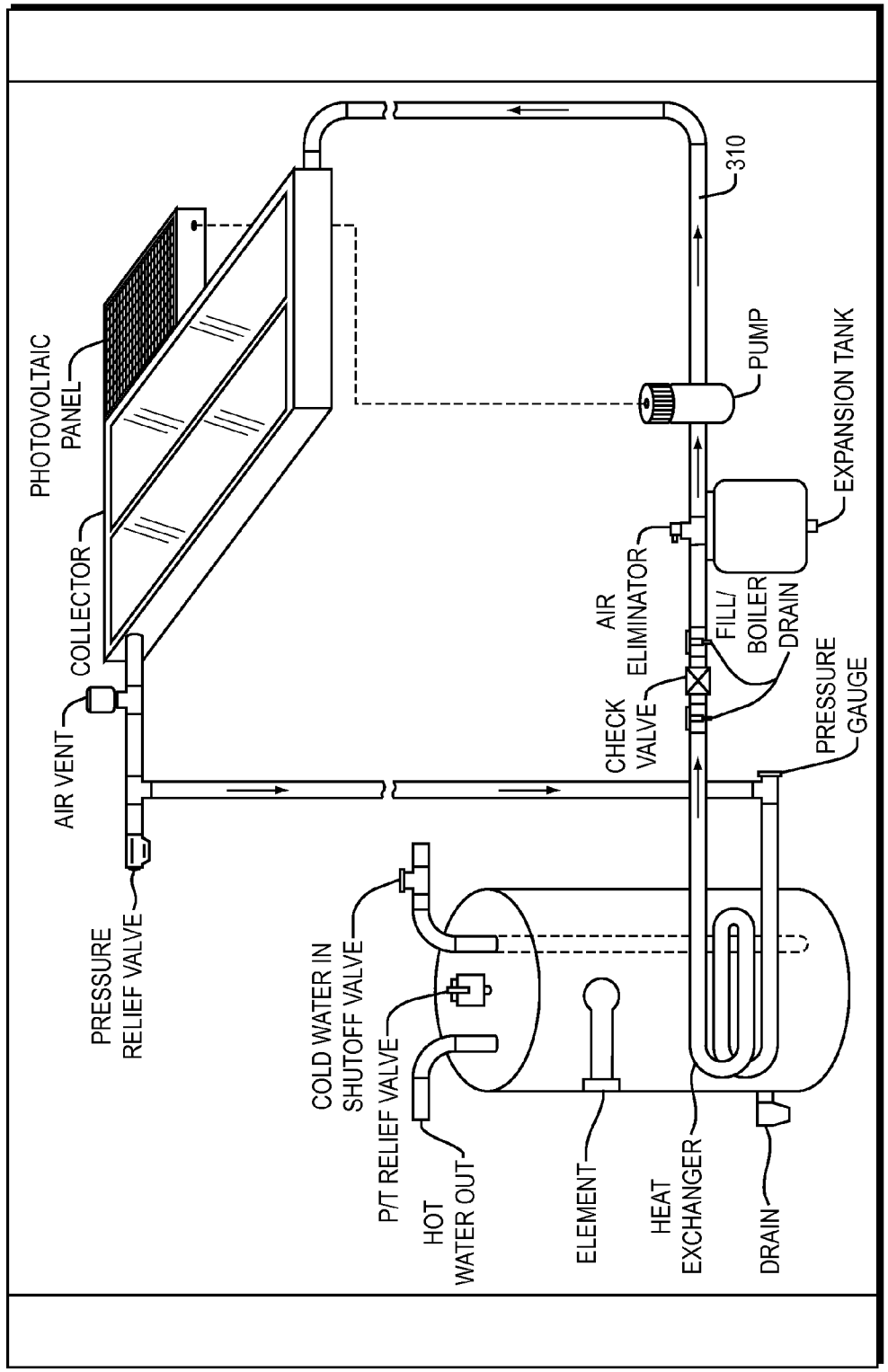

FIGS. 6A and 6B are another example of using the remote control display device to view an architectural drawing. The virtual display area is, in this example, a drawing of a solar water heating system installed in a building. A user has picked a particular pipe 310 of interest while in the mouse move mode. The user can, with hand/head movements, then follow the pipe 310 along its path (e.g. follow the path between the "tank" 320 and the "collector" 330). For example, by simply moving her hand/head to the right, the field of view thus follows the pipe section of interest as user's hand/head moves to bring the pump 340 and collector 330 both within the field of view.

The speed of movement in this mode can be controlled by the range, severity, or relative amount of the user's hand movement. For example, the amount of hand movement that causes a particular corresponding movement of the cursor and/or field of view within the virtual display can be controlled by the user in much the same way as the scale of the mouse movement is controlled within a Microsoft Windows operating system.

FIG. 7A is a list of typical voice commands that can be typically utilized in a Microsoft Windows environment. These include screen commands such as move cursor up, down, pan left, pan right, pan up, pan down, zoom in, zoom out, zoom 5×, zoom 10×, etc. Voice commands may also include commands such as "select" "back" forward" or other application specific commands such as "bold" "underline", etc.

Figure 7B:
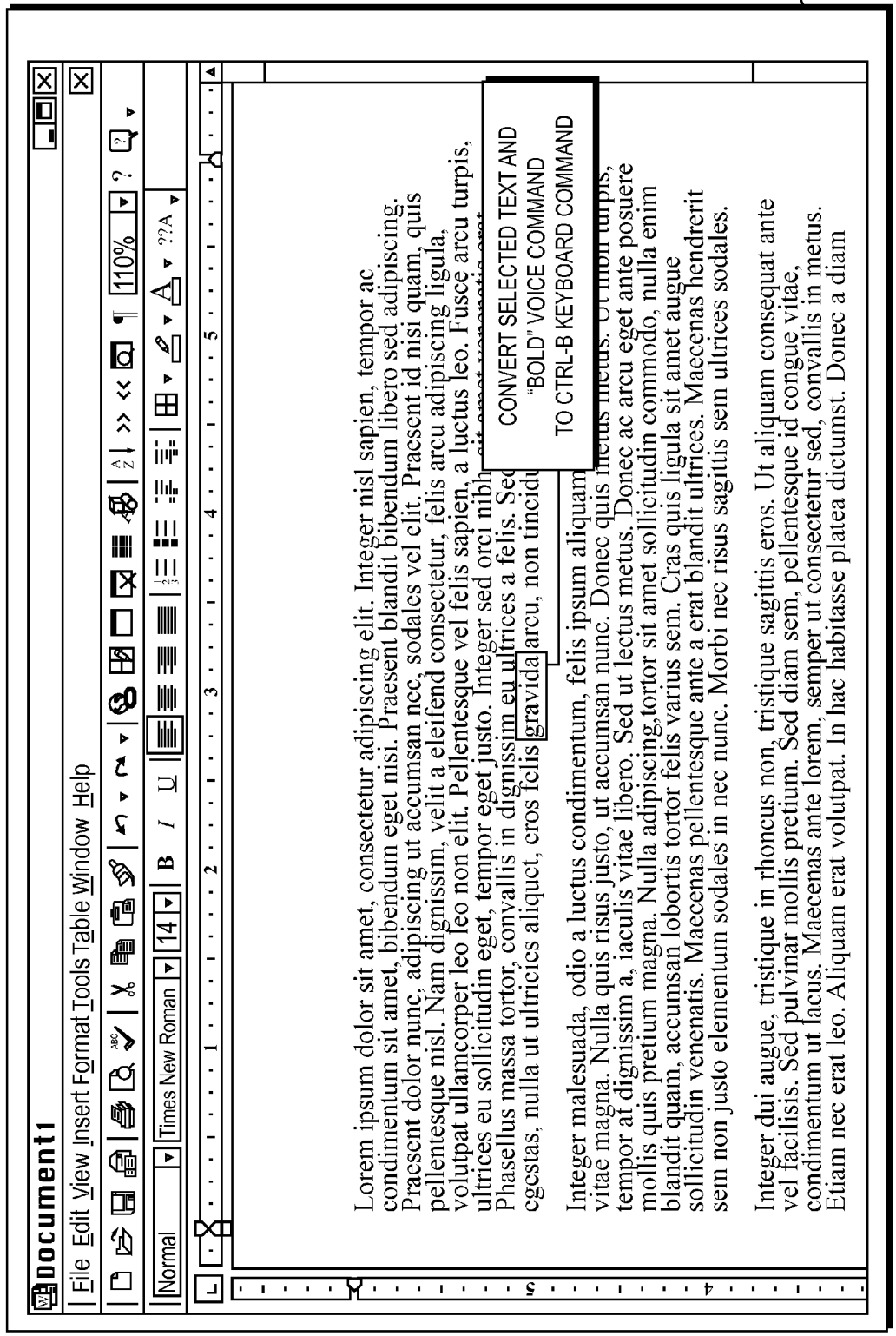
FIG. 7B illustrates how tracked head movements and a "BOLD" voice command can be used to interact with Microsoft Word.

The remote control device may also include a software overlay for supporting applications such as Microsoft Word. As shown in FIG. 7B, the application overlay may use hand/head movement and voice commands to select an area of text 710. Next, the voice commences the voice command "select bold" is converted to a Control-B command by the remote control device 100. This Control-B is then sent to the host 200 and ultimately Microsoft Word to cause the selected text 710 to be placed in the bold font.

Figure 8:
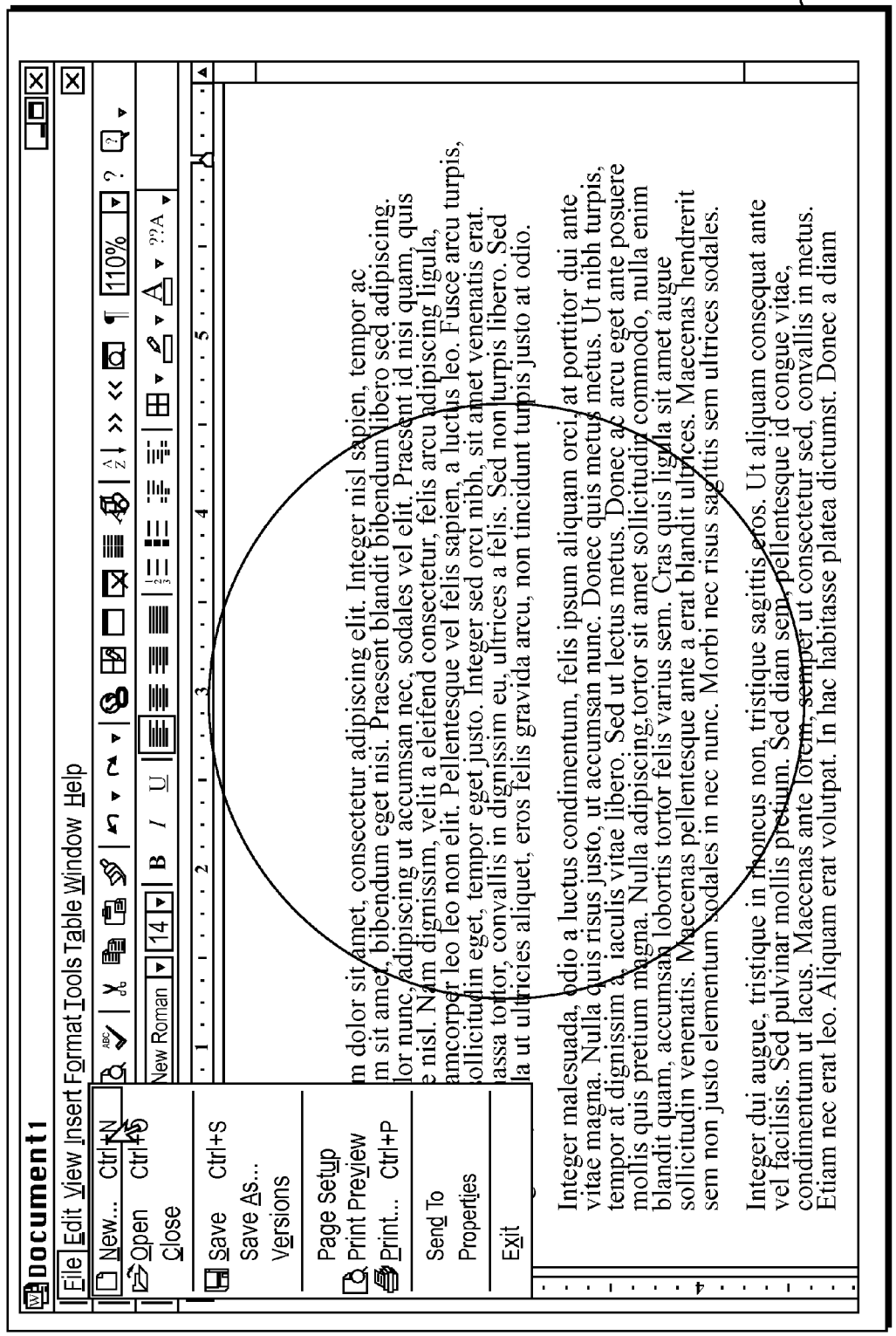
FIG. 8 shows how a person with loss of peripheral vision can utilize the remote control display device more effectively.

FIG. 8 illustrates another example using the remote control device 100 to assist people having loss of vision. A large portion of the population has vision loss requiring correction such as through the use of bifocal lenses. These people tend to be near sighted and/or have loss of peripheral vision such that only areas in the center of their view are truly in focus. They cannot typically easily use head mounted displays such as that shown in FIG. 1A. Due to this limited ability they cannot, for example, adjust their bifocals to clearly see all of the micro display, and the edges of the microdisplay 140 will appear out of focus. The apparatus described herein frees such users to select a field of view within a larger virtual display thus enabling them a much more pleasant experience.

As shown in FIG. 8, a main menu of application software typically runs across the top or bottom of a screen. However, these menu areas can often be out of focus for a person of limited vision trying to use a microdisplay 140.

Figure 9:
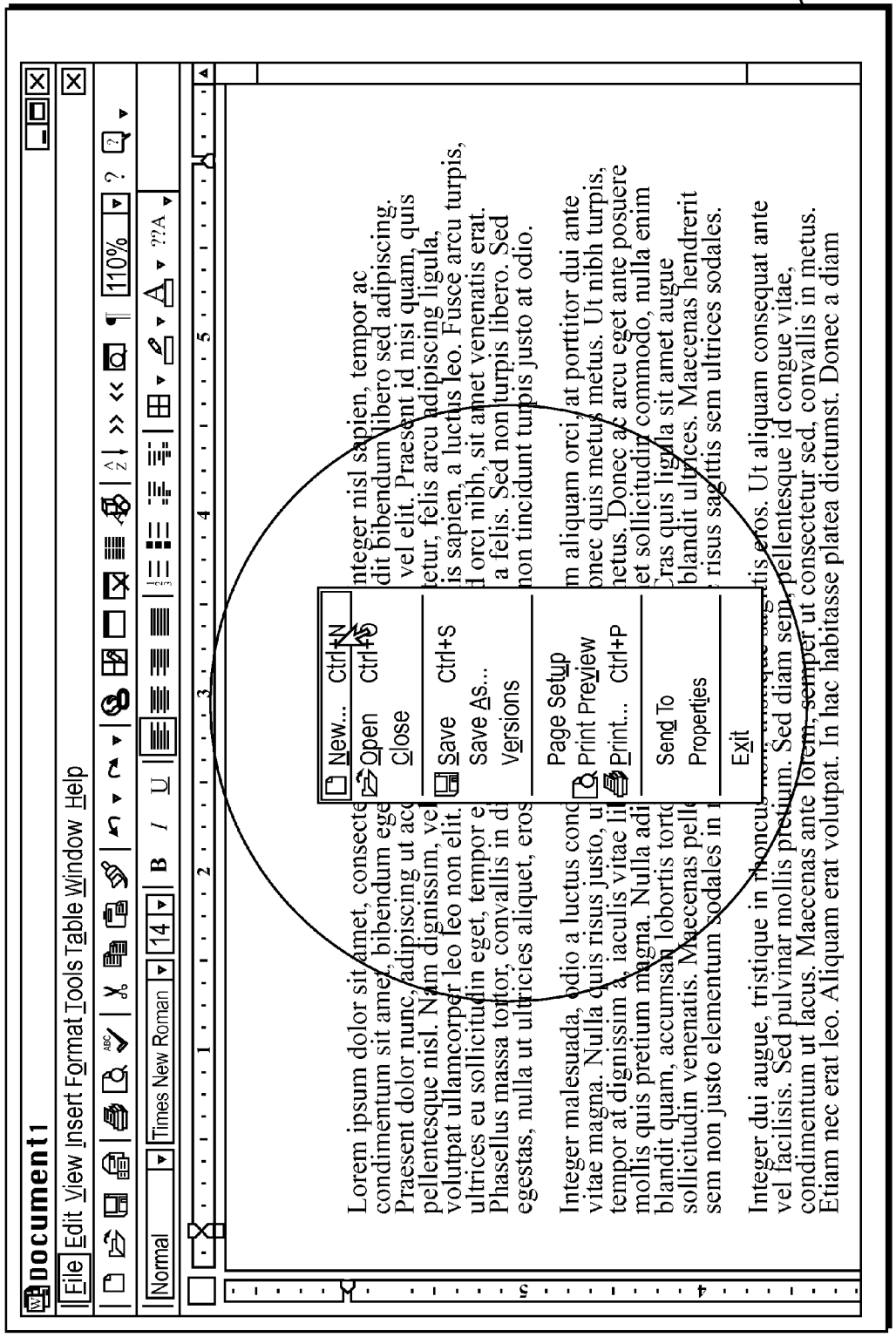
FIG. 9 is an example of how the center portion of the field of view may temporarily display a menu to assist such a person of limited vision.

Using the remote control display device 100, the main menu can instead be caused to appear in the center 250 of the field of view 300 via a voice command as shown in FIG. 9. For example, a voice command "call main menu" can force a main menu of commands 754 to appear as an overlay in the center 750 of the field of view 300, instead of adjacent to a menu bar 752 along the top 753 of the view 300. The user can then select commands within the menu such as via further verbal or hand/head movement commands. Upon selection of a command, the menu then disappears allowing a viewing of the underlying information once again.

As can now be understood, the user can utilize voice commands to either fix the field of view within the virtual area and allow hand/head movements to control the mouse position or the user can cause the cursor position to be fixed and allowing the field of view to be panned and zoomed around within the virtual area. The user can also control how much movement translates into a particular mouse or pan/zoom command, i.e., defining a scale for the movements within the context of the larger virtual display.

A unique aspect of using the remote device for the web browsing is to use voice commands in connection with head movement commands to navigate through web pages.

As can now be understood, only a portion of the virtual display presented by the host computer need be fed back from the host 200 to the remote control device 100. Thus, for example, only the amount of the display within the field of view needs to be returned.

Figure 10:
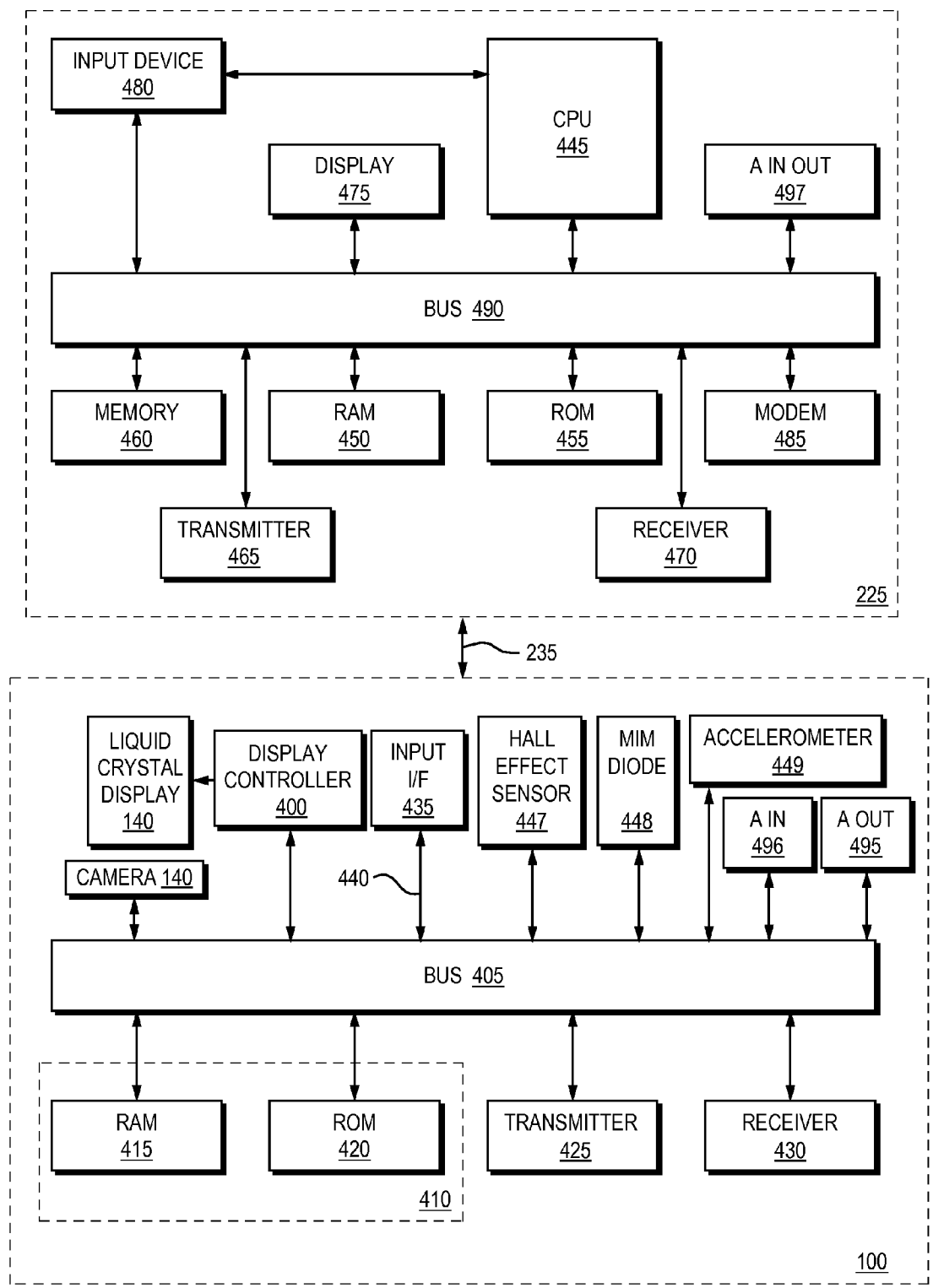
FIG. 10 is a simplified schematic block diagram illustrating internal components of an example embodiment monocular display device and a host computing device adapted to wirelessly transmit data over a bidirectional communication path.

FIG. 10 illustrates a simplified block diagram of a non-limiting example embodiment of the present monocular display device 100 and an example host computing device 225. The monocular display device 100 includes a microdisplay element 140 connected to a display controller 400, which may be a digital signal processor made by Intel™, Texas Instruments™, or Advanced Micro-Devices (AMD)™. The controller 400 is connected to a bus 405, such as a Peripheral Component Interconnect (PCI) bus. In one embodiment, the microdisplay 140 alternatively may be connected to a video graphics chip (not shown) which is connected to the bus 405.

The monocular display device 100 also includes memory 410, such as a random access memory (RAM) 415 and a read only memory (ROM) 420, which saves executable program instructions and communicates the program instructions to the controller 400 through bus 405. Preferably, the monocular display device 100 further includes a transmitter 425 and a receiver 430, and/or a combined transceiver (not shown), both of which are connected to the bus 405 to form a wireless interface with the host computing device 225. The transmitter 425 and receiver 430 also are connected to the display controller 400 over the bus 405 and receive instructions for control thereof.

The monocular display device 100 also includes an input device interface 435 which may provide an interface to a wireless mouse, trackball, or keyboard, other similar user device that may be wirelessly connected to the PCI bus 405 by a wireless link 440, which is received by the receiver 430. Lateral and rotational head movements gestures around the X, Y and Z axes may be detected by Hall effect sensors 447, MIM diodes 448, accelerometers 449 or other sensors/transducers. A camera 440 located on the device 100 may also provide input to the CPU 445 indicative of hand movements and gestures. The camera 440 may be a forward aiming video camera or an optical sensor capable of detecting hand movements. The input 435, camera 440, audio input 495 and sensors 447, 448, 449, etc. may control screen prompts on the monocular display device 100, the host computing device 225, or both, with the monocular display device 100 and the host computing device 225 in a master/slave networked relationship as desired elsewhere herein.

The host computing device 225 includes a central processing unit (CPU) 445, a memory having a RAM 450, a ROM 455, and also including a cached memory 460. The host computing device 225 further includes a transmitter 465 and receiver 470, which may be embodied as a combined transceiver. The host computing device 225 may also include a primary display 475 and an input device 480 which are both connected to a bus 490, such as a PCI bus. The bus 490 also may be connected to a wired broadband connection (not shown), wireless broadband connection 485, DSL line, cable modem, media player, music or video player, or any other suitable link to receive content.

Display controller 400 outputs control signals to the display 140 to display images. This allows the monocular display device 100 to receive data stored on the cache memory 460 of the host computing device 225. When the host computer 225 is not in use, or switched off, the data viewed on the monocular display device 100 is from the cached memory 460, and not updated. This data may be slightly older and not refreshed through the communication links 300a through 300e, as compared with when the host computing device 225 is operational. The device 100 and the host computing device 225 also may include audio input/output devices 497.

Alternatively, in a further example embodiment, the monocular display device 100 may access the host computing device 225 across the wireless communication link 235 when the host computing device 225 is on, off, or in a reduced power state, such as a sleep or hibernate state. In this embodiment, the host computing device 225 operates at minimal power and periodically scans for an impromptu, spontaneous wake-up call or command from the monocular display device 100 to trigger a low-level command in the host computing device 225 to wake up the host computing device 225 and provide content or services to the monocular display device. The host computing device 225 may be configured with a predetermined input/output (I/O) port to be monitored for a wake-up call or command that triggers the low-level command to wake up the host computing device 225. Ports include an Ethernet port or card, a WiFi™ port or card, a cellular port or card or a Bluetooth™ port or card suitable for wireless communication across the wireless communication link 235. This port is also known to the monocular display device 100 so that the wake up command may be sent properly to and received by the host computing device 225.

Any external hardwire or external wireless interface may be accessed to permit a Microsoft Windows SideShow™ gadget to access data from the hibernating host computing device 225. The host computing device 225 listens for a specific address number, name or command directed specifically to the hibernating host computing device 225 to wake-up. Receipt of the command at the host computing device 225 triggers a low-level command to wake the host computing device 225. Once awake, the host computing device 225 furnishes any and all information and services requested by the monocular display device 100.

When the transfer is finished, the monocular display device 100 may transmit a command over the wireless communication link 235 to the host computing device 225. Upon receipt of that command, the Microsoft Windows SideShow™ gadget running on the host computing device 225 triggers a system-level command to cause the host computing device 225 to reenter hibernation, for example, until needed again later. Other reduced power states may be triggered, including sleep and off.

The monocular display device 100 may provide many benefits to a user by taking advantage of the capabilities of Microsoft Windows SideShow™. Use of a Microsoft Windows SideShow™ gadget running on the host computing device prevents a user from having to carry a PC 225, for example, around when mobile or traveling. A user whose PC 225 was running the Microsoft Windows SideShow™ gadget may remotely and spontaneously contact their PC 225 from anywhere, thereby instantly receiving the host computing device 225 information content and services needed, and then return their PC 225 to a hibernation state.

Further, the monocular display device 100 allows large facilities to reduce their computer and accessory power consumption by allowing users to not have to leave computers running when not attended while still providing their users immediate access to all or the PC information, computing services and their normal access to company computer resources at user demand. It also reduces general PC maintenance, repair and even damage during travel. Moreover, a reduction in running unattended PCs allows large facilities to reduce air-conditioning power requirements to cool un-attended PCs and allows unattended PCs, even many servers, to be placed in hibernation until the moment they are required.

The monocular display device 100 also allows PC users to no longer have to wait for their PCs to boot-up (e.g., 5-10 minutes per boot-up cycle is not unusual). Whether the PC is in near proximity to the user (e.g., ≤30 feet) and accessed from hibernation by a Bluetooth™ wireless command, WiFi™ command or over a greater distance by cellular wireless command or even over the Ethernet interface, the PC is hibernating and ready to spring into action when called upon by the user. For example, after a PC is booted in the morning of a work day or just prior to taking a trip, the PC may remain in a hibernating mode and not have to be booted again, until absolutely necessary or desired by the user.

Further, a PC user may use the Microsoft Windows SideShow™ gadget to provide remote access to storage, contents, applications and services of the host computing device, and may operate remotely without requiring user interaction with the host computing device through protocols, such as Remote Display Protocol (RDP) and Virtual Network Computing (VNC), and commercial services, such as GoToMyPC.

Figure 11:
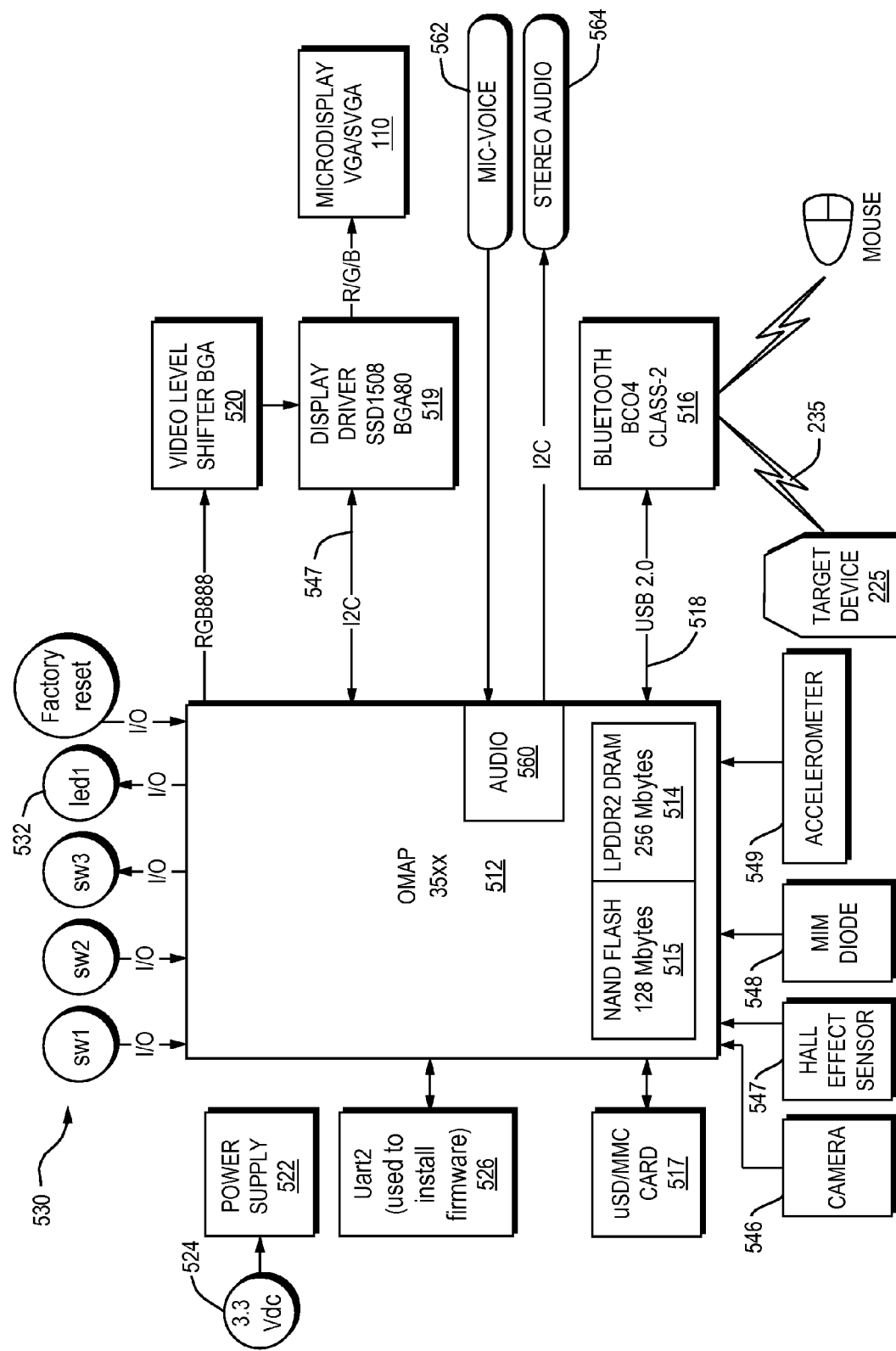
FIG. 11 is a detailed schematic block diagram illustrating internal components an example embodiment monocular display device to receive a content over a Bluetooth™ connection.

FIG. 11 provides a more detailed view of the electronic components incorporated into the monocular display device 100, which is connected to host computing devices 225 to receive a digital video signal over a Bluetooth connection. These components are described in greater detail in a co-pending patent application U.S. application Ser. No. 12/348,627, filed on Jan. 5, 2009, entitled "Method And Apparatus For Transporting Video Signal Over Bluetooth Wireless Interface", which is incorporated herein by reference.

In the preferred embodiment, the monocular display device 100 includes an Advanced Reduced instruction set computer (RISC) Machine (ARM)/Digital Signal Processor (DSP) 512 (which may be an Open Multimedia Application Platform (OMAP) 3500 series processor, available from Texas Instruments of Dallas, Tex.), memory 514, Bluetooth interface 516 which may be provided by a Class 2 Bluetooth interface available from Cambridge Silicon Radio (CSR) of Cambridge, England), display driver 519 (which may, for example, be an SSD1508 display driver available from Kopin Corporation of Westborough, Mass.), video level shifter circuits 520, a power supply 522 supported by a battery 524, universal receiver transmitters (UART) 526 (such as may be used for debugging) and memory 515. A Secure Digital (SD), eXtreme Digital (xD), USB SD (uSD) memory 517 or other similar interfaces may be used to store application programs, kernel directives, or configuration data, and/or connect to devices such as a digital camera. A number of input device 530 may be associated with the device (e.g., switch 1/switch 2/switch 3 and reset inputs), camera 546, Hall effect sensors 547, MIM diodes 548, accelerometers 549, track pads and scroll wheels, and an LED output 532 (led 1). A VGA or better quality microdisplay element 140 and audio input and output device(s) 560, which may include microphone input 562 and stereo outputs 564, are also provided.

The signal may be sent over the Bluetooth™ wireless communication link 235 established using Serial Port Profile (SPP) from the monocular display device 100 to the host computing device 225, as opposed to using any of the "advanced" Bluetooth modes, which provides greater throughput higher than the higher layer protocols imposed by such advanced modes that have been found not to be needed in this application. In the Bluetooth™ radio 516, a video signal received over the Bluetooth™ connection is sent over the USB connection 518 to the processor 512. One design consideration is to optimize data packet format, given known data buffer sizes. Internal to the Bluetooth™ radio 516 is a packet buffer default size of 1000 bytes. This may be modified to force streaming video signals to use only about a 990 byte buffer size. The processor 512 may expect the received video content to be encoded with the H.264 (Motion Picture Experts Group (MPEG)-4 part 10) formatting, using the so-called baseline profile or better.

In a preferred embodiment, the processor 512 may use a multi-tasking embedded operating system. The processor 512 operates on the received video signal as follows. An MPEG format container file (e.g., a .MP4 file) is made available. In one preferred embodiment, this may be a proprietary file format, although the specific details of the input .MP4 file format chosen are not important here, as long as the processor 512 is programmed to correctly process it. The processor 512 then opens a communication port to the host computing device 225 and receives the file over the USB interface 518 from the Bluetooth™ radio 516.

An MP4 decoder in the processor 512 strips the file into respective audio and video streams. More particularly, the processor 512 decodes the input file H.264 compressed digital video signal into a YCbCr baseband component video signal. The processor 512 may also divide the associated compressed audio (formatted as an Advanced Audio Coding (AAC) format signal) into baseband stereo audio.

The processor 512 may output video in any suitable format such as an 8 bit, International Telecommunication Union Radiocommunication Sector (ITU-R) Recommendation BT. 656 or Society of Motion Picture and Television Engineers (SMPTE) 293M 16 bit YUV progressive scan signals with separate sync signals, to the display driver 519. The decompressed video signal is forwarded over an internal ARM bus of the processor 512. The ARM bus then sends the content directly to the display driver 519 via the SMPTE 293M interface. The Intelligent Interface Controller (I2C) interface 547 is used to configure the microdisplay element 140. The processor 512 also outputs the baseband audio to the audio output Compression/Decompression Module (CODEC) 560. It may take mono or stereo audio input and produce suitable stereo output signals.

Figure 12:
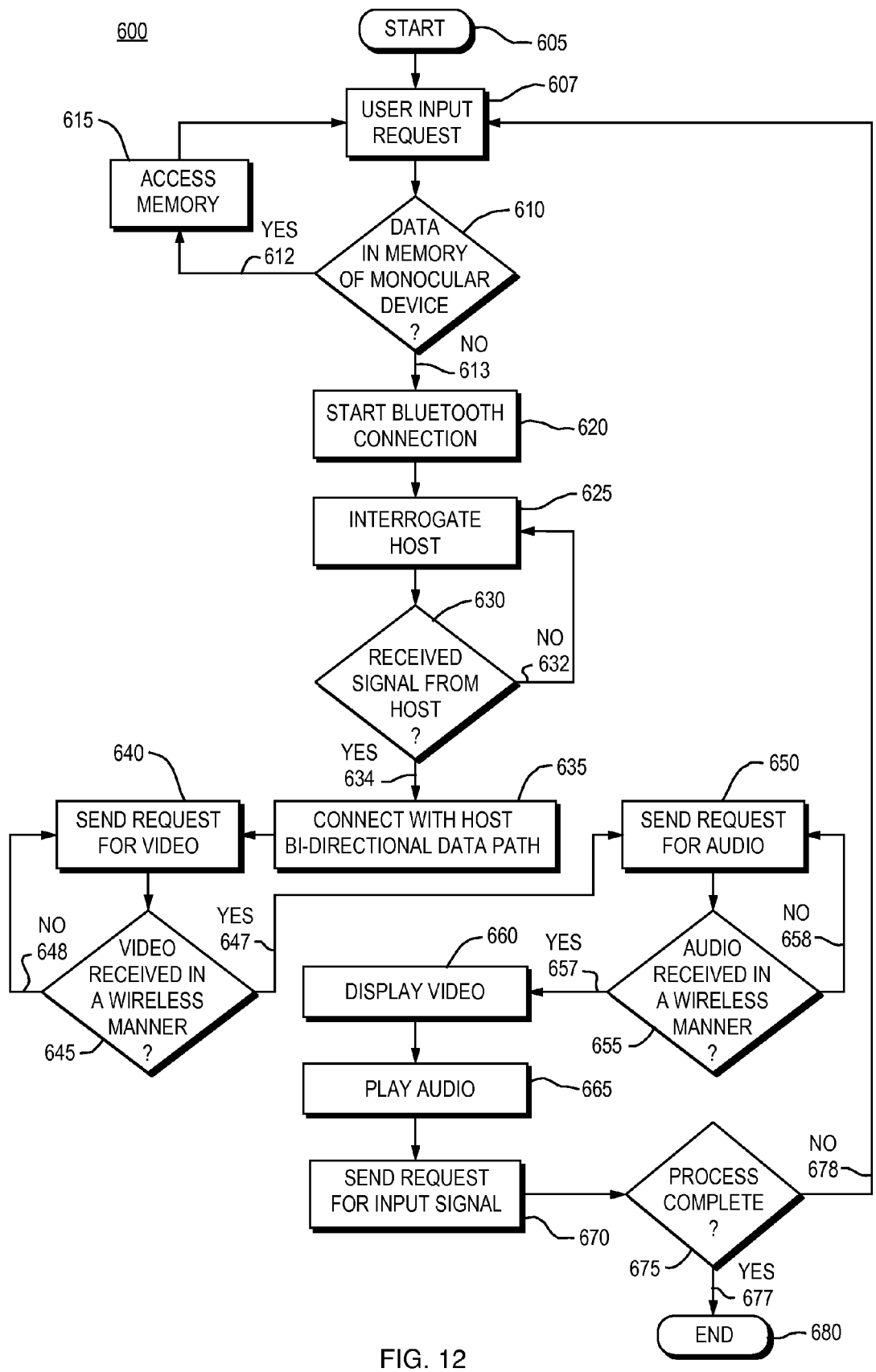
FIG. 12 is a flow diagram illustrating a method of operation of an example embodiment monocular display device.

FIG. 12 is a flow diagram of a method 600 of operation according to an embodiment of the monocular display device. In a first step, the method commences (step 605). Thereafter, the monocular display device awaits (step 607) a user input request. This input may be any signal output from an input device, such as, for example, an output generated by user head movement of the monocular display device as detected by MIM diodes, Hall effect sensors or accelerometers, or from the camera detecting a hand motion or gesture or from a wireless trackball, a wireless mouse, or a wireless key pad, or a button located on the housing of the monocular display device.

In one embodiment, using an operating system such as Microsoft Windows Mobile™ operating system, and using a hand gesture input and voice command, the user may "double click" an icon on the monocular display device screen (e.g., microdisplay element 140 of FIG. 1A) to indicate to open an electronic mail message, or to open an application. Please refer to the above discussion of FIG. 3A through FIG. 8 for specific examples. Thereafter, the method 600 attempts to receive data from a source of content, in response to the request, and the method determines (step 610) whether the content source is located in a memory on the monocular display device (e.g., memory 410 of FIG. 4), such as, for example, on a camera output, or whether, the source is located at another remote location, such as, on the host computing device (e.g., host computing device 225 of FIG. 2). If the data is indeed stored locally (step 612) and no wireless link is needed, then the local memory is accessed (step 615) and the data is configured to be retrieved and loaded for subsequent display on the display element. Once the method 600 accesses the local memory (step 615), the method 600 returns to wait for a new user input request (step 607).

However, if the data is located on a remote memory or in a memory not located on the monocular display device (step 613) then a Bluetooth™ connection, or other previously described wireless connection(s), is started (step 620) to obtain the data as requested (step 607). Other wireless communication formats may also be used, as previously discussed, and the present method 600 is for illustration purposes only.

The device's transmitter (e.g., transmitter 425 of FIG. 10) may be activated to interrogate the host computing device, and to send an initial configuration signal to the receiver (e.g., receiver 470 of FIG. 4) of the host computing device (step 625). The host determines whether the Bluetooth™ signal is sufficiently powered and was received from the monocular display device 100 (step 630). Once the signal is received, the host transmitter (e.g., transmitter 465 of FIG. 10) sends a confirmation signal to the monocular display device receiver (e.g., receiver 430 of FIG. 10) using a second predetermined signal. If the signal was not received (step 632), then the monocular display device continues to interrogate the host (step 625). A stronger or more directive signal is sent. If the signal is received correctly by the host computing device (step 634), then a bi-directional communication data path is formed across the wireless link (e.g., wireless link 150 of FIG. 1A) (step 635). Uplink and downlink signals may be communicated across the bidirectional connection data path to and from the devices (e.g., monocular display device 100 and host computing device 200 of FIG. 1A), the present method being merely illustrative as various diagnostic, utility applications and signals that may be sent along the wireless link in addition to the nonlimiting method of FIG. 6.

Once the bi-directional communication data path is formed (step 635), multimedia data files may be communicated from the host computing device to the monocular display device. In one non-limiting embodiment, the bandwidth of the communication path is sufficient in bits per second (bps) that, when operating Microsoft Windows Vista™ Operating System at the host computing device, the graphical output of the host display output screen (e.g., host display 475 of FIG. 10) is visible in real time at the microdisplay element (e.g., microdisplay element 140 of FIG. 10), such that if both displays were held side by side, a cursor movement occurs on both screens substantially simultaneously to enable remote operation of the host computing system at the monocular display device.

The display controller (e.g., controller 400 of FIG. 10) sends a request for a video signal from the computing device (step 640). The request is communicated to the bus 405, and to the transmitter and then sent across the link. Thereafter, the monocular display device determines whether the video signal was received from the host computing system in a wireless manner (step 645). If the signal was received wirelessly (step 647), then the monocular display device requests audio (step 650). If the signal was not received in a wireless manner (step 648), then the monocular display device returns to send another request (step 640).

The display controller sends a request for an audio signal from the host computing device (step 650). The audio and the video signal may be sent as one continuous signal and the present disclosure is not limited by any such two signal embodiment. The request is communicated to the bus (e.g., bus 405 of FIG. 10), to the transmitter, and then sent across the link. The monocular display device then determines whether the audio signal was received from the host computing system in a wireless manner (step 655). If the audio signal was wirelessly received (step 647), then the monocular display device displays video (step 660). If the audio data or signal was not received wirelessly (step 648), then the monocular display device returns to send another request (step 650).

Program instructions cause the monocular display device to display video on the microdisplay element by the display controller (step 660) and play audio using the audio device (e.g., audio output device 495 of FIG. 10) (step 665). Thereafter, a request for a further input signal is sent (step 670). It is then determined whether the process is complete (step 675). If the process is complete (step 677), then the method ends (step 680). If the process is not complete (step 678), a further user input request is awaited (step 607). Various control configurations are possible and within the scope of the present disclosure, and the present configuration is for illustration purposes only, and multiple other steps for encryption, and to decipher host computing or other external computing device formats may be carried out.

Figure 13:
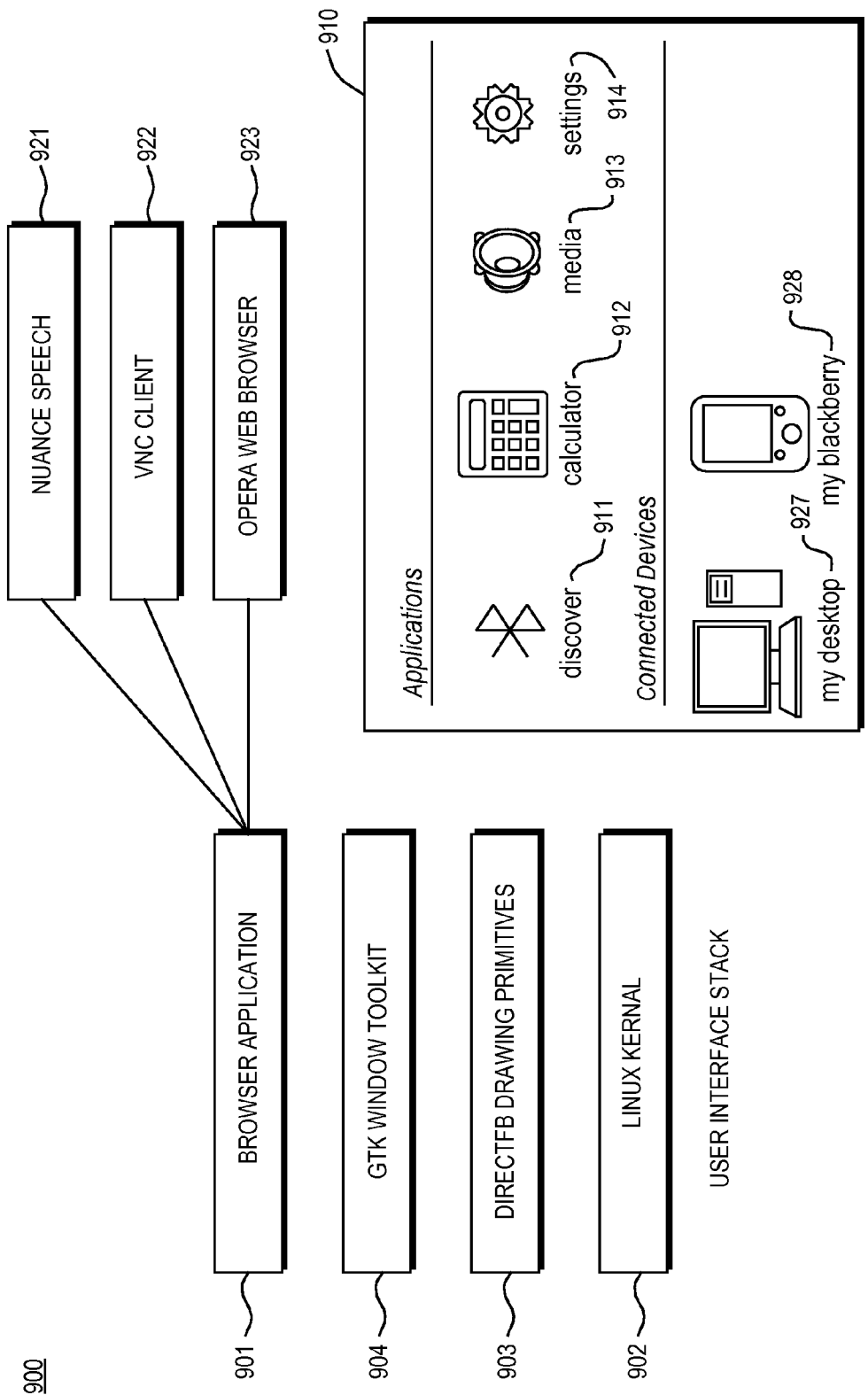
FIG. 13 is a high level software diagram indicating how an example embodiment monocular display device may be used to control and manage various hosts through a user interface.

FIG. 13 is a high level software diagram indicating how the monocular display device 100 may be used to control and manage various hosts 225 through a user interface. A software stack 900 includes a device application browser 901 which may run on top of the kernel of an operating system (OS), such as a Linux kernel 902, drawing primitives, such as those provided by a Direct FB (DirectFB) stack 903, and a graphical tool kit, such as a Gimp Tool Kit (GTK) window tool kit 904. The device application browser 901 allows a user to access application software for monocular display device 100 through an icon and menuing interface. This typically consists of custom code written for the particular monocular display device 100.

The OS 902 is ported to run on the processor in the monocular display device 100, such as the OMAP 3500 series ARM/DSP shown in FIG. 11. The kernel level 902 otherwise provides standard operating system functions. The drawing primitives layer 903 may be a somewhat thin graphical library that provides for graphic acceleration input device handling and abstraction integrated windowing system. The end result is a graphical user display 910 which has various applications available to the user, such as Bluetooth™ discovery 911, a calculator 912, media player 913 and a settings interface 914.

Applications running within the context of the device application browser 901 may include a speech input 921, a Virtual (Desktop) Network client 922, and a web browser 923. Virtual Network is a system that allows a personal computer (PC) to be controlled remotely. It does this by exporting an entire screen display to another device in the form of a bitmap. This bitmap is wrapped in a network protocol and received by the device and simply displayed. Similarly, any mouse movements or keyboard entry data detected by the local device are passed directly to the remote PC to be acted upon.

The speech command interface 921 provides or allows for voice input commands to control the application browser 901. Thus, for example, a user may say the word "calculator" which is detected by the speech device, which causes the operating system 902 to launch the calculator application. In general, text labels displayed next to on-screen buttons or icons within the context of the application browser indicate a spoken word which activates the corresponding button. Digital inputs (e.g., MIM diodes, Hall effect sensors, accelerometers and switches as illustrated in FIGS. 1B, 1C, 4 and 5) also may be used to navigate and select menu functions allowing for full control and editing of applications and associated data.

Discovery application 911, as will be understood shortly, allows not only for discovery of neighboring Bluetooth™ devices but also connecting them through to the application browser level. For example, shown in the example user display 910 is the fact that there are presently two connected devices, including a desktop computer 927 and a Blackberry™ 928. The devices 927, 928 have been discovered through operation of the discover application 911. This may be, for example, initiated on first power up of the monocular display device 100 or by a user manually initiating a Bluetooth™ discovery process. The Bluetooth™ device discovery proceeds as per the Bluetooth™ specification, reporting any new Bluetooth™ layer devices as they are connected at a physical layer.

At this point, however, additional functionality is provided to permit communication with the Bluetooth™ devices at a network level. In particular, a client 927, 928 is told to open a special port on a local host address that is local to the monocular display device 100. This device port acts as a proxy, always looking for such requests. When a request is received, it reports back an available network level address (i.e., such as a TCP/IP address) to be used by an individual device 927, 928 for network level communication.

Figure 14:
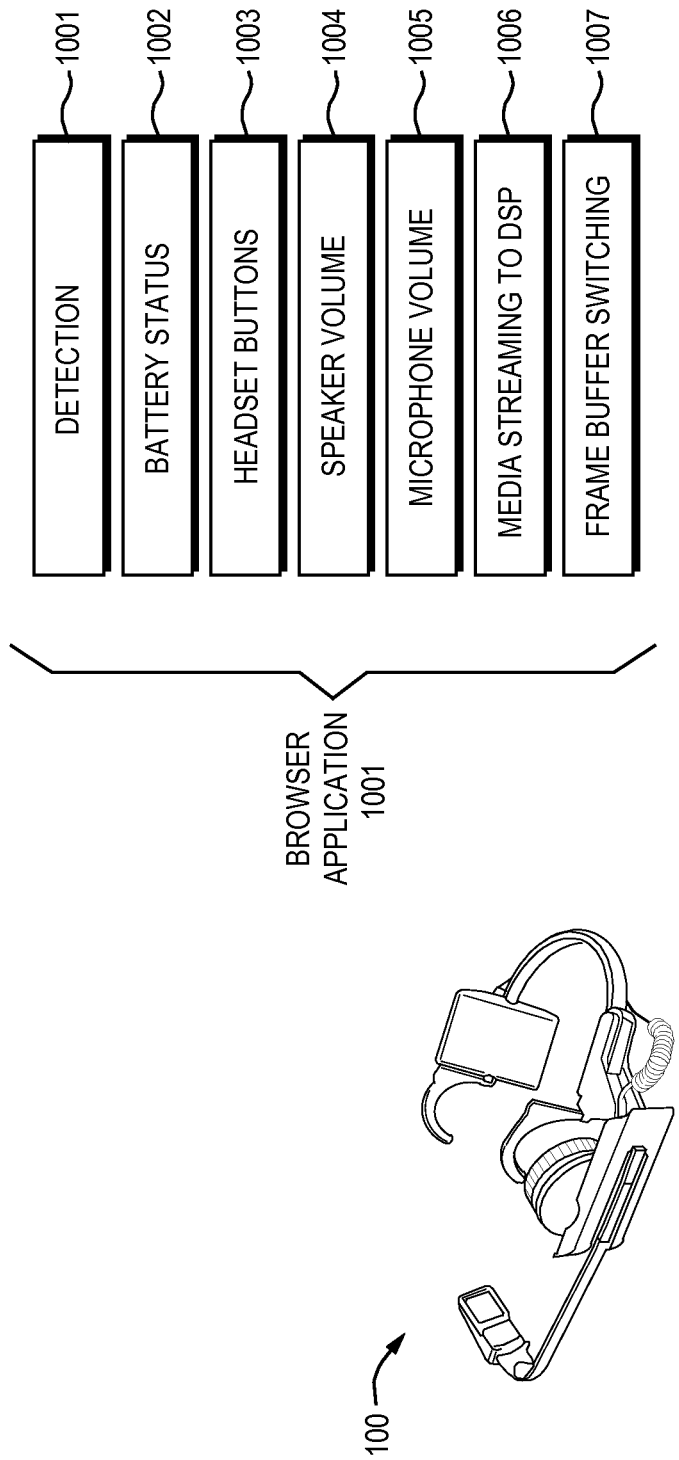
FIG. 14 is a diagram illustrating an example hardware interface of an example embodiment monocular display device.

FIG. 14 illustrates hardware interface functionality also provided by the browser application 901 of FIG. 13 which may receive and/or control various hardware functions on the monocular display device 100. Such functions may include monocular display device detection 1001, battery status 1002, output device adjustment, such as headset button 1003, speaker volume 1004, microphone volume 1005, media streaming functions 1006, frame buffer switching 1007, device drivers, and like functions.

Figure 15:
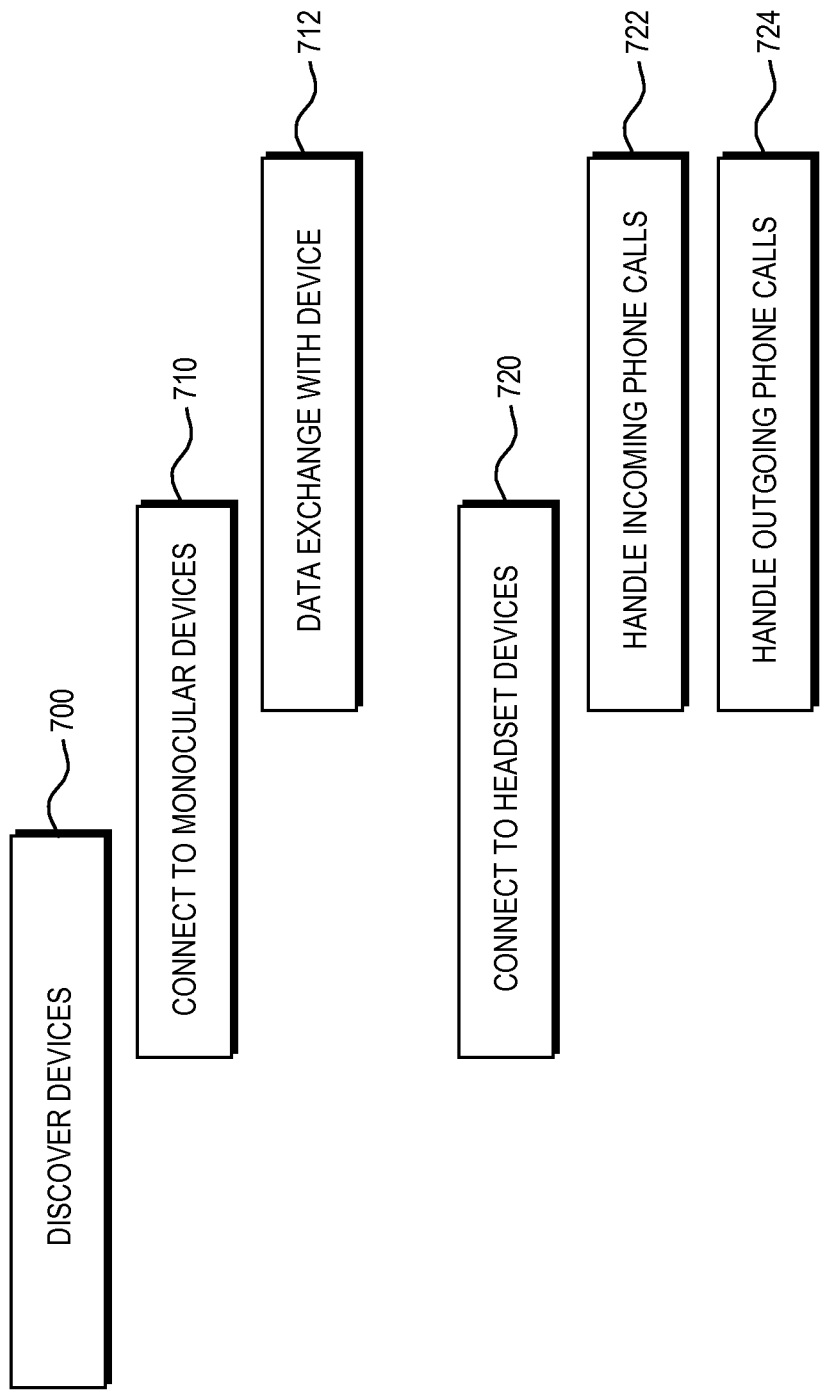
FIG. 15 is a diagram illustrating a Bluetooth™ protocol stack including a proxy function.

FIG. 15 illustrates a Bluetooth protocol stack implemented in the Bluetooth link 150 of FIG. 1A, with the addition of a special proxy function. The Bluetooth™ layer does provide for discovery of Bluetooth™ devices 1100 as in any standard Bluetooth™ device. However, monocular display device 100 connected 1110 also provide for protocol information permitting data exchange with such devices 1112. It may also connect to other types of headset devices 1120, such as telephone headset devices which may provide for handling of incoming calls 1122 and outgoing calls 1124.

Figure 17:
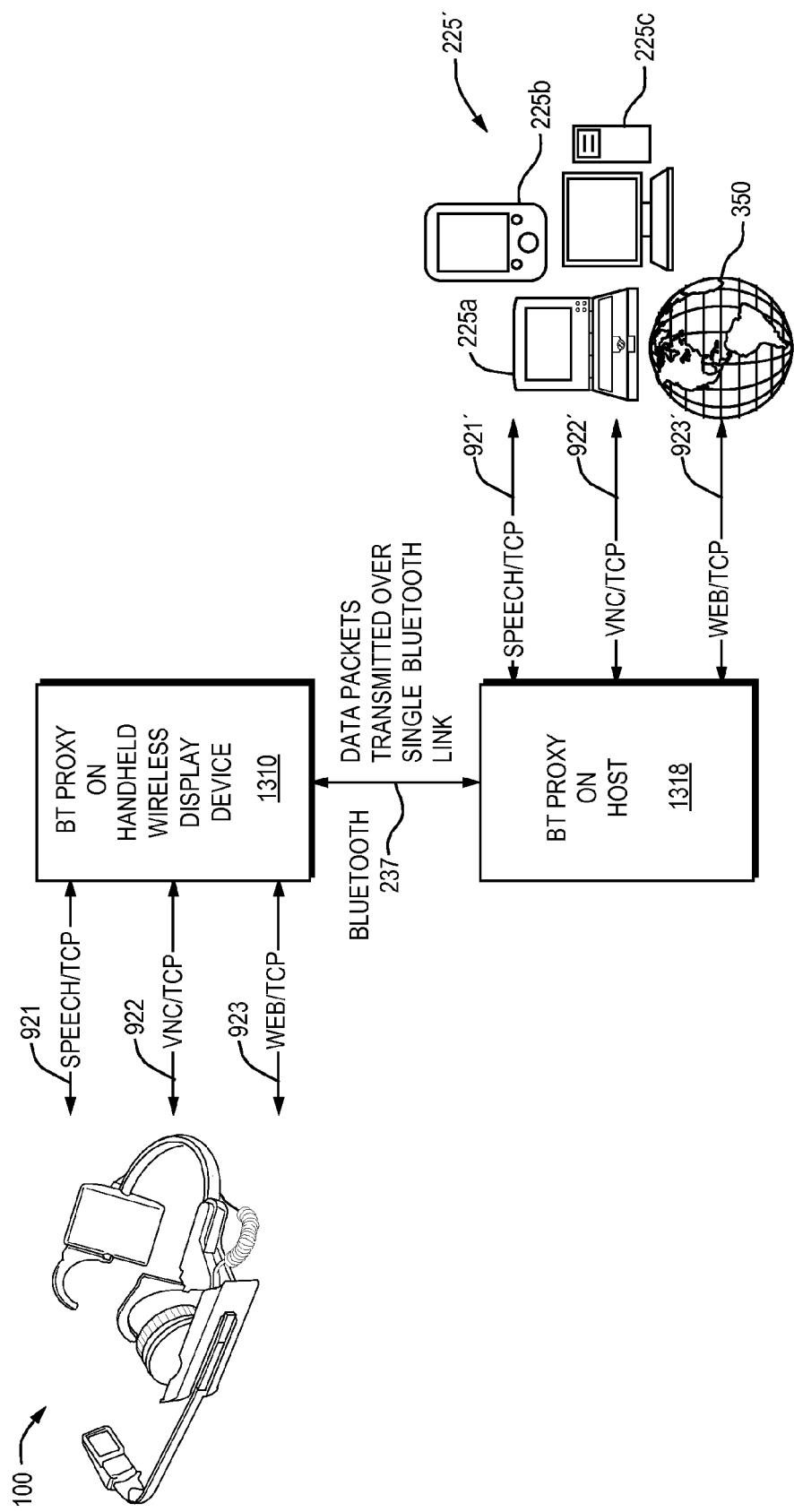
FIG. 17 is a block diagram illustrating a Bluetooth™ proxy for carrying data packets over a bidirectional communication path in greater detail.

FIGS. 16A-16B and 17 show more detail of the proxy functionality provided by the Bluetooth™ interface 237.

FIG. 16A illustrates a traditional approach involving multiple direct TCP-layer connections to data sources. For example, each application running in the context of application browser 901 of FIG. 13, such as a speech recognition application 921, virtual network client 922, and a web browser client 923, might each require one or more TCP connections to the data sources provided by host computing devices 225. Traditional systems involve multiple direct TCP connections to data sources.

FIG. 16B illustrates how, although Bluetooth™ itself does not provide any direct connection to the Internet 350 or other high layer networks, a connection between the monocular display device 100 and the Internet 350 may be supported by a proxy 1230 via an Internet enabled host computing device 225. Bluetooth™ cannot connect directly to Internet; it must be proxied via an Internet enabled device. Thus, for example, applications such as the web browser 923 typically require host computing devices 225 to act as a networking proxy.

FIG. 17 illustrates a preferred arrangement in which a single Bluetooth™ link 150 supports multiple applications 921-923. The multiple application 921-923 require that the single Bluetooth™ connection 237 support multiple sockets, such as Transmission Control Protocol (TCP) connections. For example, while each application 921-923 might otherwise require multiple TCP connections, instead the Bluetooth™ proxy layer 1310 added between the standard Bluetooth™ layer and regular TCP protocol layer funnels the multiple requested TCP connections onto a single socket. The single socket provided by Bluetooth™ link 237 then transports the multiple connections to the host computing device 225.

A similar inverse functionality 1318 provided on the host computing device side 225 to unravel packets to their respective connection 921'-923'.

While Bluetooth™ itself does allow for multiple connection sockets between a host and client, many mobile phone operators impose a single connection limit. Thus, a single connection limit must be observed in many instances. This permits not only greater security, but avoids the possibility of having a wireless device be swamped with Bluetooth™ connection requests.

This approach also permits a standard web browser application 923, for example, to operate without requiring modification to its use of TCP sockets. Thus, the operation of the Bluetooth proxy 1310 provided on the monocular display device 100 and proxy function 1318 provided on the host computing device 225 insulate the applications 921-923 running within application browser 901 and also insulate the applications running on host computing device 225 from such modified socket functionality. For example, a virtual network running on a host computing device 225 now need not be modified.

Figure 18:
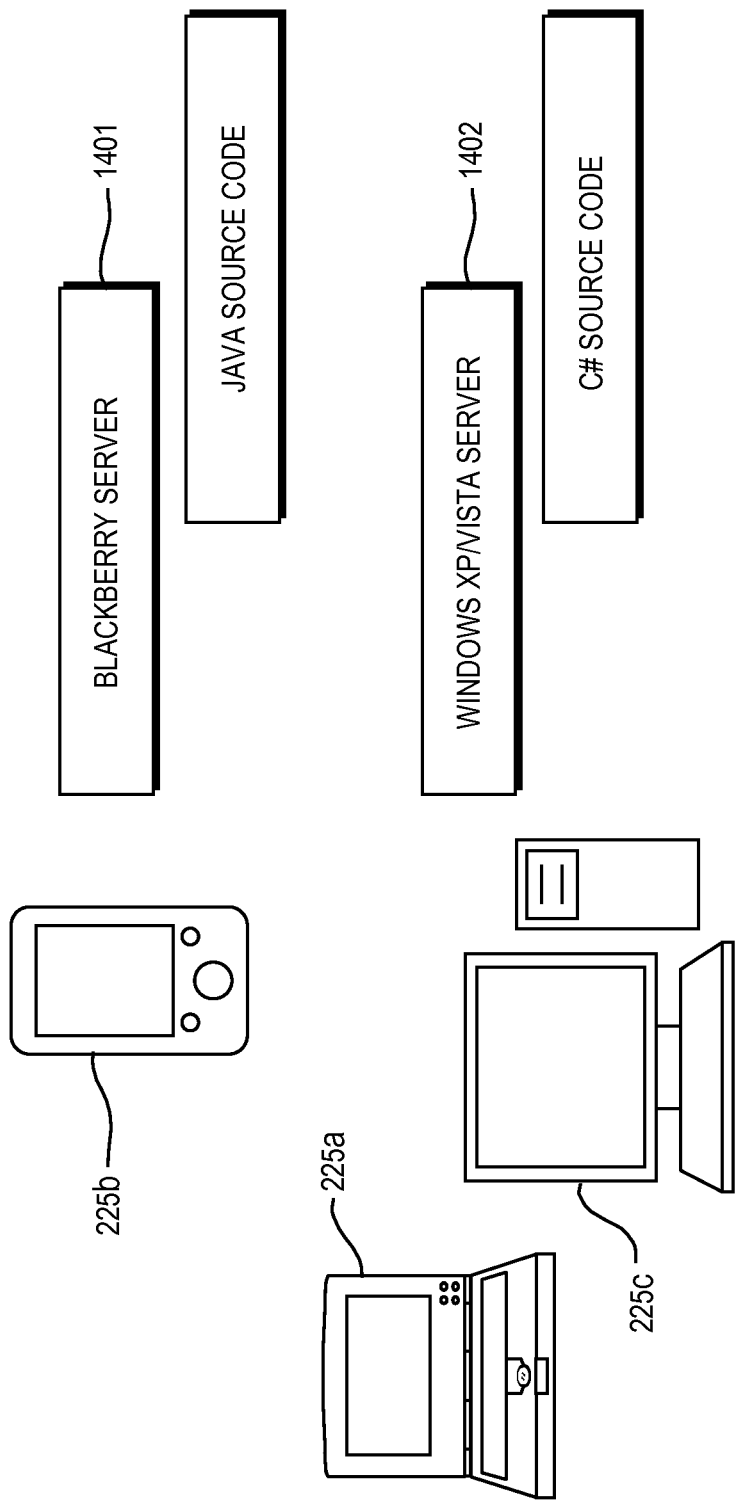
FIG. 18 is a block diagram illustrating device drivers.

FIG. 18 illustrates device drivers provided to insulate the device application browser 901 from having to know specifics of content format for particular host devices. Thus, for example, a Blackberry server 1401 is provided for a Blackberry host 225b, and a Windows Vista server 1402 is provided for a Windows machine host 225c. This allows the user interface specifics for particular hosts computing devices 225 to be presented as a generic interface to the monocular display device 100. The servers 1401, 1402 provide at least two functionalities, including the Bluetooth™ proxy functionality 1318 of FIG. 13 (i.e., unpacking TCP channel data into multiple required channels) and a content server.

Figure 19:
FIG. 19 is a block diagram illustrating device content.

FIG. 19 illustrates processing of device content by the servers 1401, 1402 of FIG. 18. These may include a content format piece for each type of respective content including email inbox 1501, contact list 1502, stock ticker 1503, media browser 1504 and the like. Each of these server functionalities 1501-1504 reformats its content using a page markup language. The page markup language may then be interpreted by the content browser 901 on the monocular display device. The content browser 901 may now interpret the page markup language generically to fit the various requirements of the monocular display device 100.

In alternate embodiments, a function such as a Microsoft Windows SideShow™ may take formatted content from a Windows device and format it according to SideShow requirements. Microsoft Windows SideShow is a technology introduced with the Windows Vista release of the Microsoft™ operating system that enables Windows PC to drive a variety of auxiliary display devices connected to a main PC. These devices may be separate from or integrated in to the main PC, for example, and display embedded on the outside of a laptop lid, etc.

With the virtual network and/or Microsoft Windows SideShow™ functionality, the monocular display device 100 may also become a "chameleon", in effect taking on the same user screen, same graphical user interface, and familiar user control of the host computing device 225. Even if the monocular display device 100 accepts several host computing devices 225 at the same time (i.e., a blackberry, a cell phone, and a PC), a user is permitted to switch between the host devices. Each time the user makes such a switch, the user may see and still recognize the familiar slave or host and device user screen, the same graphical user interface (GUI), and same familiar controls and commands.

It is thus now understood how content may be viewed by the monocular display device 100 in different ways, all selectable by the user by using head movement and/or hand gestures combined with voice input, including new applications written for the device itself; device applications, web applications, a web browser, etc., and Microsoft Windows SideShow™ applications, or native applications via a virtual network connection.

With the Bluetooth proxy support, the effect of pushing through original hosted device GUI interface, screens, command and control interfaces, may be supported for multiple devices at the same time.

While this invention has been particularly shown and described with references to example embodiments thereof, it will be understood by those skilled in the art that various changes in form and details may be made therein without departing from the scope of the invention encompassed by the appended claims.

The invention claimed is:

1. A headset computer comprising:
a high-resolution microdisplay, for displaying visual information received from a local processor;
a motion detector, for detecting physical movement of a body part of a user, and to provide a motion input; and
the local processor located in the headset computer, operatively coupled to the high-resolution microdisplay and the motion detector, and further comprising:
a receiver, for locally receiving the motion input;
a translator, for translating, at the local processor, the motion input to a user command, the user command being executable by a host processor to control a host display, the host processor and host display being separated from the headset computer; wherein the user command is processed by the local processor to control an aspect of visual information displayed on the high-resolution microdisplay and controls any of: display field of view, navigation in a display view, display zoom/pan/scale format, and selection in display view;
a communication interface, for forwarding the user command to the host processor, and for receiving information from the host processor to be displayed at the high-resolution microdisplay in response to the user command; wherein the communication interface is a direct wireless link between the headset computer and the host processor; and
a display controller, for forwarding the information to be displayed on the high-resolution microdisplay in correspondence with display output at the host display, the information to be displayed further including at least a visual confirmation of the local processor having processed the motion input corresponding to the user command.

2. The headset computer of claim 1 further comprising:
a microphone, for receiving audio signals from the user; and
wherein the local processor further comprises:
a speech recognizer, for locally processing the audio signals to produce a voice command; and
wherein the translator further combines the voice command with the motion input to determine the user command.

3. The headset computer of claim 1 wherein the motion detector provides two or more motion inputs indicative of motion in two or more dimensions.

4. The headset computer of claim 1 wherein the motion detector is a camera for detecting hand movement of the user.

5. The headset computer of claim 1 wherein the motion detector is a head movement tracking device for detecting head movement of the user.

6. The headset computer of claim 1, wherein the user command controls a field of view.

7. The headset computer of claim 1, wherein the user command
controls a zoom, pan, or scale factor.

8. The headset computer of claim 1, wherein the user command selects an item.

9. The headset computer of claim 8 wherein the item is a hyperlink.

10. The headset computer of claim 1 wherein the reply results in a cursor movement.

11. A method for operating a headset computer having a high resolution microdisplay, a motion detector, a wireless communication interface, and a local processor, comprising:
displaying visual information received from the local processor on the high-resolution microdisplay, the local processor located in the headset computer and operatively coupled to the high-resolution microdisplay;
using the motion detector for detecting physical movement of a body part of a user as a motion input to the local processor, the local processor operatively coupled to the motion detector;
locally translating the motion input to a user command, the user command being executable by a host processor to control a host display, the user command processed by the local processor to control an aspect of visual information displayed on the high-resolution microdisplay;
forwarding the user command to the host processor directly using the wireless communications interface;
receiving visual information from the host processor to be displayed at the high-resolution microdisplay in response to the user command; and
displaying the visual information on the high-resolution microdisplay in correspondence with display output at the host display, the visual information further including at least a visual confirmation of the local processor having processed the motion input corresponding to the user command.

12. The method of claim 11 wherein one aspect of the visual information is a field of view.

13. The method of claim 11 wherein one aspect of the visual information is a zoom, pan, or scale factor.

14. The method of claim 11 wherein the motion detector provides two or more motion inputs indicative of motion of the user in two or more dimensions.

15. The method of claim 11 wherein the motion detector is a camera for detecting hand movement of the user.

16. The method of claim 11 wherein the motion detector is a head movement tracking device for detecting head movement of the user.

17. The headset computer of claim 1 wherein the display of the information on the high resolution microdisplay is substantially simultaneous with display of said information at the host display.

18. The method of claim 11 wherein the displaying of the information on the high resolution microdisplay is substantially simultaneous with display of said information at the host display.

* * * * *